US012675923B2

(12) United States Patent
Kerr et al.

(10) Patent No.: US 12,675,923 B2
(45) Date of Patent: Jul. 7, 2026

(54) CHANGING COORDINATE SYSTEMS FOR DATA BOUND OBJECTS

(71) Applicant: Adobe Inc., San Jose, CA (US)

(72) Inventors: Bernard Kerr, Sausalito, CA (US); Dmytro Baranovskiy, Sydney (AU)

(73) Assignee: Adobe Inc., San Jose, CA (US)

( * ) Notice: Subject to any disclaimer, the term of this patent is extended or adjusted under 35 U.S.C. 154(b) by 289 days.

(21) Appl. No.: 17/980,476

(22) Filed: Nov. 3, 2022

(65) Prior Publication Data

US 2024/0153169 A1 May 9, 2024

(51) Int. Cl.
*G06T 11/26* (2026.01)
*G06T 11/60* (2006.01)

(52) U.S. Cl.
CPC .............. *G06T 11/26* (2026.01); *G06T 11/60* (2013.01); *G06T 2200/24* (2013.01)

(58) Field of Classification Search
CPC .... G06T 11/206; G06T 11/60; G06T 2200/24
See application file for complete search history.

(56) References Cited

U.S. PATENT DOCUMENTS

| | | | | | |
|---|---|---|---|---|---|
| 5,226,118 | A | * | 7/1993 | Baker | ................ G05B 23/0232 |
| | | | | | 715/833 |
| 5,359,724 | A | * | 10/1994 | Earle | ....................... G06F 40/18 |
| | | | | | 711/E12.003 |
| 5,437,008 | A | * | 7/1995 | Gay | ........................ G06T 11/60 |
| | | | | | 345/677 |

| | | | | | |
|---|---|---|---|---|---|
| 5,461,708 | A | * | 10/1995 | Kahn | ...................... G06T 11/26 |
| | | | | | 345/440 |
| 5,581,678 | A | * | 12/1996 | Kahn | ...................... G06T 11/26 |
| | | | | | 345/440 |
| 5,608,899 | A | * | 3/1997 | Li | .......................... G06F 16/248 |
| 5,619,631 | A | * | 4/1997 | Schott | ................... G06F 3/0481 |
| | | | | | 345/440 |
| 5,990,888 | A | * | 11/1999 | Blades | .................... G06T 11/26 |
| | | | | | 715/764 |
| 5,999,192 | A | * | 12/1999 | Selfridge | ............... G06F 16/26 |
| | | | | | 345/440 |
| 6,222,540 | B1 | | 4/2001 | Sacerdoti | |

(Continued)

OTHER PUBLICATIONS

Final Office Action, U.S. Appl. No. 17/980,481, Nov. 26, 2024, 93 pages.

(Continued)

*Primary Examiner* — Charles L Beard
(74) *Attorney, Agent, or Firm* — Nicholson De Vos Webster & Elliott LLP

(57) ABSTRACT

Embodiments are disclosed for changing coordinate systems for data bound objects. In some embodiments, a method of changing coordinate systems for data bound objects includes receiving a selection of at least one graphic object associated with a data visualization on a canvas of a graphic design application, wherein the data visualization includes a plurality of graphic objects. Additionally, a request is received to convert the data visualization from a first coordinate space to a second coordinate space. A subset of the plurality of graphic objects to convert to the second coordinate space is identified, the subset of the plurality of graphic objects having a same object type. A view of the plurality of graphic objects is generated by converting the subset of the plurality of graphic objects to the second coordinate space.

17 Claims, 15 Drawing Sheets

(56) References Cited

U.S. PATENT DOCUMENTS

| | | | | |
|---|---|---|---|---|
| 6,995,768 | B2 * | 2/2006 | Jou | G06F 9/542 |
| | | | | 345/440 |
| 7,158,123 | B2 * | 1/2007 | Myers | G06F 3/0421 |
| | | | | 345/173 |
| 7,574,652 | B2 * | 8/2009 | Lennon | G06F 16/242 |
| | | | | 715/248 |
| 7,644,361 | B2 * | 1/2010 | Wu | G06F 16/90324 |
| | | | | 715/273 |
| 7,788,606 | B2 * | 8/2010 | Patel | G06F 3/04883 |
| | | | | 345/181 |
| 8,405,657 | B2 * | 3/2013 | Breton | G06T 15/50 |
| | | | | 345/426 |
| 8,527,909 | B1 * | 9/2013 | Mullany | G06F 3/0484 |
| | | | | 345/173 |
| 8,581,840 | B2 * | 11/2013 | Mudu | G06F 3/04886 |
| | | | | 345/173 |
| 8,661,358 | B2 * | 2/2014 | Duncker | G06F 16/972 |
| | | | | 715/765 |
| 8,743,122 | B2 * | 6/2014 | Riche | G06F 16/9038 |
| | | | | 345/440 |
| 8,860,762 | B2 * | 10/2014 | Koshi | G06F 3/0484 |
| | | | | 345/642 |
| 9,058,365 | B2 * | 6/2015 | Baumgaertel | G06F 16/248 |
| 9,134,901 | B2 * | 9/2015 | Cragun | G06F 3/04883 |
| 9,135,233 | B2 * | 9/2015 | Fan | G06F 16/24578 |
| 9,158,766 | B2 * | 10/2015 | Blyumen | G06F 16/00 |
| 9,202,297 | B1 * | 12/2015 | Winters | G06T 11/26 |
| 9,251,548 | B1 * | 2/2016 | Garrity | G06T 1/00 |
| 9,323,445 | B2 * | 4/2016 | Kritt | G06F 40/18 |
| 9,377,864 | B2 * | 6/2016 | Tullis | G06Q 10/101 |
| 9,389,777 | B2 * | 7/2016 | Sekharan | G06F 3/0488 |
| 9,513,792 | B2 * | 12/2016 | Koshi | G06F 3/01 |
| 9,558,172 | B2 * | 1/2017 | Rampson | G06F 40/18 |
| 9,563,674 | B2 * | 2/2017 | Hou | G06F 16/242 |
| 9,569,082 | B1 * | 2/2017 | Jin | G06F 3/04847 |
| 9,690,449 | B2 * | 6/2017 | Morozov | G06F 3/0482 |
| 9,760,262 | B2 * | 9/2017 | Drucker | G06F 3/04845 |
| 9,761,026 | B1 * | 9/2017 | Barabas | G06T 11/26 |
| 9,792,017 | B1 * | 10/2017 | Landefeld | G06T 19/00 |
| 9,804,726 | B1 * | 10/2017 | Joos | G06F 3/048 |
| 9,817,563 | B1 | 11/2017 | Stokes et al. | |
| 9,824,470 | B2 * | 11/2017 | Kuo | G06T 11/26 |
| 9,892,531 | B2 * | 2/2018 | Csenteri | G06T 11/206 |
| 10,049,141 | B2 * | 8/2018 | Prophete | G06F 16/2455 |
| 10,109,086 | B1 * | 10/2018 | Bakshi | G06T 11/26 |
| 10,146,846 | B2 * | 12/2018 | Genochio | G06Q 10/06 |
| 10,275,305 | B2 * | 4/2019 | Venkateswarulu | |
| | | | | G06F 16/2452 |
| 10,282,360 | B2 * | 5/2019 | Krause | G06F 16/248 |
| 10,416,871 | B2 * | 9/2019 | Hou | G06F 16/904 |
| 10,423,313 | B2 | 9/2019 | Olsson et al. | |
| 10,521,077 | B1 * | 12/2019 | Beran | G06F 3/0482 |
| 10,685,035 | B2 * | 6/2020 | Keahey | G06F 16/26 |
| 10,698,599 | B2 * | 6/2020 | D'angelo | G06F 3/04883 |
| 10,732,810 | B1 * | 8/2020 | Cohen | G06F 3/04847 |
| 10,809,881 | B2 * | 10/2020 | Kindelsberger | G06F 3/04847 |
| 10,877,984 | B1 | 12/2020 | Martino et al. | |
| 11,023,110 | B2 | 6/2021 | Kerr | |
| 11,042,558 | B1 * | 6/2021 | Hearst | G06F 40/18 |
| 11,270,483 | B1 * | 3/2022 | Chilamakuri | G06T 11/26 |
| 11,340,750 | B1 * | 5/2022 | Willis | G06F 16/34 |
| 11,625,149 | B2 * | 4/2023 | Leyden | G06F 3/0482 |
| | | | | 715/810 |
| 12,056,445 | B2 * | 8/2024 | Dvorak | G06F 3/0486 |
| 12,423,879 | B2 * | 9/2025 | Rho | G06T 11/00 |
| 2002/0059258 | A1 * | 5/2002 | Kirkpatrick | G06F 16/951 |
| 2002/0118192 | A1 * | 8/2002 | Couckuyt | G06F 3/0486 |
| | | | | 715/769 |
| 2004/0030504 | A1 | 2/2004 | Helt et al. | |
| 2004/0085316 | A1 * | 5/2004 | Malik | G06T 11/26 |
| | | | | 345/440 |
| 2005/0068320 | A1 * | 3/2005 | Jaeger | G06T 11/26 |
| | | | | 345/440 |

| | | | | |
|---|---|---|---|---|
| 2005/0108643 | A1 * | 5/2005 | Schybergson | G06F 16/447 |
| | | | | 715/713 |
| 2005/0232055 | A1 * | 10/2005 | Couckuyt | G06F 3/0486 |
| | | | | 365/227 |
| 2006/0103651 | A1 * | 5/2006 | Kessler | G06T 11/26 |
| | | | | 345/440.1 |
| 2007/0060798 | A1 * | 3/2007 | Krupnik | A61B 5/065 |
| | | | | 600/300 |
| 2007/0126736 | A1 * | 6/2007 | Tolle | G06T 11/26 |
| | | | | 345/440 |
| 2008/0195643 | A1 * | 8/2008 | Sheth-Voss | G06F 16/252 |
| 2009/0096812 | A1 * | 4/2009 | Boixel | G06T 3/18 |
| | | | | 345/646 |
| 2009/0322755 | A1 * | 12/2009 | Holm-Peterson | G06F 8/34 |
| | | | | 345/440 |
| 2010/0005411 | A1 * | 1/2010 | Duncker | G06Q 30/0601 |
| | | | | 715/769 |
| 2010/0308102 | A1 | 12/2010 | Mochizuki | |
| 2011/0115814 | A1 * | 5/2011 | Heimendinger | G06F 3/04883 |
| | | | | 345/173 |
| 2011/0283231 | A1 * | 11/2011 | Richstein | G06F 16/2423 |
| | | | | 715/810 |
| 2011/0302025 | A1 * | 12/2011 | Hsiao | G06Q 30/0242 |
| | | | | 705/14.42 |
| 2011/0307509 | A1 * | 12/2011 | Hsiao | G06Q 30/02 |
| | | | | 705/14.54 |
| 2012/0089902 | A1 * | 4/2012 | Sheflin | H04L 67/02 |
| | | | | 715/234 |
| 2012/0166470 | A1 * | 6/2012 | Baumgaertel | G06Q 10/10 |
| | | | | 707/769 |
| 2012/0254783 | A1 * | 10/2012 | Pourshahid | G06F 3/04883 |
| | | | | 715/771 |
| 2013/0009963 | A1 * | 1/2013 | Albrecht | G06T 13/80 |
| | | | | 345/473 |
| 2013/0080444 | A1 * | 3/2013 | Wakefield | G06T 11/26 |
| | | | | 707/E17.084 |
| 2013/0086107 | A1 * | 4/2013 | Genochio | G06F 16/26 |
| | | | | 707/769 |
| 2013/0097177 | A1 * | 4/2013 | Fan | G06F 16/438 |
| | | | | 707/805 |
| 2013/0145244 | A1 * | 6/2013 | Rothschiller | G06F 40/18 |
| | | | | 715/212 |
| 2013/0187926 | A1 * | 7/2013 | Silverstein | G06F 16/248 |
| | | | | 345/440 |
| 2013/0229416 | A1 * | 9/2013 | Krajec | G06T 11/26 |
| | | | | 345/440 |
| 2013/0232174 | A1 * | 9/2013 | Krajec | G06F 16/9024 |
| | | | | 707/798 |
| 2013/0249917 | A1 * | 9/2013 | Fanning | G06T 11/26 |
| | | | | 345/440 |
| 2013/0275904 | A1 * | 10/2013 | Bhaskaran | G06F 3/0484 |
| | | | | 715/771 |
| 2014/0053091 | A1 * | 2/2014 | Hou | G06F 3/04886 |
| | | | | 715/810 |
| 2014/0149947 | A1 * | 5/2014 | Blyumen | G06F 11/3089 |
| | | | | 715/863 |
| 2014/0267290 | A1 * | 9/2014 | Hao | G06T 11/26 |
| | | | | 345/440 |
| 2014/0282184 | A1 * | 9/2014 | Dewan | G06F 3/0484 |
| | | | | 715/771 |
| 2014/0282276 | A1 * | 9/2014 | Drucker | G06F 3/04845 |
| | | | | 715/863 |
| 2014/0300603 | A1 * | 10/2014 | Greenfield | G06T 11/20 |
| | | | | 345/440 |
| 2015/0015504 | A1 * | 1/2015 | Lee | G06F 3/017 |
| | | | | 345/173 |
| 2015/0026095 | A1 * | 1/2015 | Ohana | G06Q 40/06 |
| | | | | 705/36 R |
| 2015/0040047 | A1 * | 2/2015 | Baarz | G06F 16/904 |
| | | | | 715/769 |
| 2015/0127505 | A1 * | 5/2015 | Parikh | G06Q 40/02 |
| | | | | 345/619 |
| 2015/0294275 | A1 * | 10/2015 | Richardson | G06Q 10/1093 |
| | | | | 705/7.18 |
| 2015/0317807 | A1 * | 11/2015 | Bartley | G06T 11/26 |
| | | | | 345/419 |

(56) References Cited

U.S. PATENT DOCUMENTS

| | | | | |
|---|---|---|---|---|
| 2015/0339032 | A1* | 11/2015 | Bandera | G06F 16/26 |
| | | | | 715/772 |
| 2015/0355835 | A1* | 12/2015 | Tsukahara | G06F 3/04883 |
| | | | | 345/173 |
| 2016/0026695 | A1* | 1/2016 | Fan | G06F 40/18 |
| | | | | 707/723 |
| 2016/0027193 | A1* | 1/2016 | Schiffer | G06Q 10/06 |
| | | | | 345/440 |
| 2016/0055232 | A1* | 2/2016 | Yang | G06F 3/04842 |
| | | | | 707/740 |
| 2016/0055659 | A1* | 2/2016 | Wilson | G06F 3/04883 |
| | | | | 345/440 |
| 2016/0062555 | A1* | 3/2016 | Ward | G06F 40/14 |
| | | | | 715/778 |
| 2016/0103872 | A1* | 4/2016 | Prophete | G06Q 10/0639 |
| | | | | 707/722 |
| 2016/0291845 | A1* | 10/2016 | Lingappa | G06F 3/04845 |
| 2016/0307344 | A1* | 10/2016 | Monnier | G06T 11/26 |
| 2016/0314606 | A1* | 10/2016 | Tolle | G06T 11/26 |
| 2016/0350951 | A1* | 12/2016 | Chan | G06T 11/26 |
| 2017/0004638 | A1* | 1/2017 | Csenteri | G06T 11/26 |
| 2017/0039741 | A1* | 2/2017 | Bhatnagar | G06T 11/26 |
| 2017/0053425 | A1* | 2/2017 | Lee | G06T 11/26 |
| 2017/0205998 | A1* | 7/2017 | Jin | G06F 3/04847 |
| 2017/0228898 | A1 | 8/2017 | Liu et al. | |
| 2017/0236312 | A1* | 8/2017 | Ruble | G06T 11/26 |
| | | | | 345/440 |
| 2017/0300545 | A1* | 10/2017 | Lee | G06F 16/26 |
| 2017/0344236 | A1* | 11/2017 | Drucker | G06F 3/04883 |
| 2018/0025073 | A1 | 1/2018 | Singh et al. | |
| 2018/0089237 | A1* | 3/2018 | Dunne | G06F 16/219 |
| 2018/0129513 | A1* | 5/2018 | Gloystein | G06F 9/453 |
| 2018/0137667 | A1* | 5/2018 | Kindelsberger | G06F 3/0482 |
| 2018/0165844 | A1 | 6/2018 | Kirichenko et al. | |
| 2018/0165851 | A1* | 6/2018 | Apte | G06F 40/177 |
| 2018/0174337 | A1* | 6/2018 | Menard | G06T 11/26 |
| 2018/0294046 | A1* | 10/2018 | Kamura | G06Q 10/10 |
| 2018/0306839 | A1 | 10/2018 | Donnal et al. | |
| 2018/0341392 | A1* | 11/2018 | Zheng | G06F 3/04847 |
| 2018/0349516 | A1* | 12/2018 | Dutta | G06F 3/0484 |
| 2018/0365303 | A1* | 12/2018 | Prophete | G06F 16/904 |
| 2019/0043228 | A1* | 2/2019 | Bhat | G06T 11/26 |
| 2019/0065036 | A1* | 2/2019 | Drucker | G06F 3/04845 |
| 2019/0114054 | A1* | 4/2019 | Kerr | G06F 3/04842 |
| 2019/0114055 | A1* | 4/2019 | Kerr | G06F 3/04842 |
| 2019/0114057 | A1* | 4/2019 | Kerr | G06F 3/04845 |
| 2019/0114308 | A1* | 4/2019 | Hancock | G06F 3/0481 |
| 2019/0114817 | A1* | 4/2019 | Kerr | G06F 40/18 |
| 2019/0311812 | A1* | 10/2019 | Sweeney | A61B 5/0022 |
| 2019/0324072 | A1* | 10/2019 | Underwood | G01R 27/02 |
| 2020/0004412 | A1* | 1/2020 | Ahuja | G06F 3/04883 |
| 2020/0005509 | A1* | 1/2020 | Gibb | G06T 11/60 |
| 2020/0110394 | A1 | 4/2020 | Hirata | |
| 2020/0393940 | A1* | 12/2020 | Stewart | G06F 3/0482 |
| 2021/0081663 | A1* | 3/2021 | Pandit | G06V 30/413 |
| 2021/0256019 | A1* | 8/2021 | Prophete | G06F 40/205 |
| 2022/0004293 | A1* | 1/2022 | Stewart | G06T 13/80 |
| 2022/0027555 | A1* | 1/2022 | Dvorak | G06F 3/0486 |
| 2022/0202320 | A1 | 6/2022 | Diener et al. | |
| 2022/0300882 | A1* | 9/2022 | Malik | G06Q 10/06393 |
| 2022/0405993 | A1* | 12/2022 | Li | G06F 3/0482 |
| 2023/0077829 | A1* | 3/2023 | Lee | G06Q 10/0639 |
| | | | | 705/7.38 |
| 2023/0230300 | A1* | 7/2023 | Yagi | G06F 11/323 |
| | | | | 345/419 |
| 2023/0305679 | A1 | 9/2023 | Marco et al. | |
| 2024/0078484 | A1* | 3/2024 | Kolano | G06Q 30/0201 |
| 2024/0087194 | A1* | 3/2024 | Breckenridge | |
| | | | | G06Q 10/063112 |
| 2024/0153170 | A1* | 5/2024 | Kerr | G06T 11/26 |
| 2024/0153171 | A1* | 5/2024 | Kerr | G06T 11/26 |
| 2024/0169615 | A1* | 5/2024 | Chen | G06T 11/26 |
| 2024/0257201 | A1* | 8/2024 | Griesbeck | G06Q 30/0621 |
| 2024/0265595 | A1* | 8/2024 | Zhao | G06F 16/248 |
| 2025/0118040 | A1* | 4/2025 | Cardwell | G06F 3/04845 |

OTHER PUBLICATIONS

Non-Final Office Action, U.S. Appl. No. 17/980,485, Jul. 22, 2024, 25 pages.
Chroma.js Color Palette Helper, available online at <https://web.archive.org/web/20210420231939/https://vis4.net/palettes/#/9|s|00429d,96ffea,ffffe0|ffffe0,ff005e,93003a|1|1>, Apr. 20, 2021, 1 page.
Github, "chroma.js", available online at <https://web.archive.org/web/20210322202649/https://gka.github.io/chroma.js/>, Mar. 22, 2021, 24 pages.
Kennedy Design, Inc., "Divergent Color Scale", available online at <https://www.learnui.design/tools/data-color-picker.html#divergent>, 2023, 3 pages.
Non-Final Office Action, U.S. Appl. No. 17/980,481, Apr. 12, 2024, 33 pages.

* cited by examiner

1400

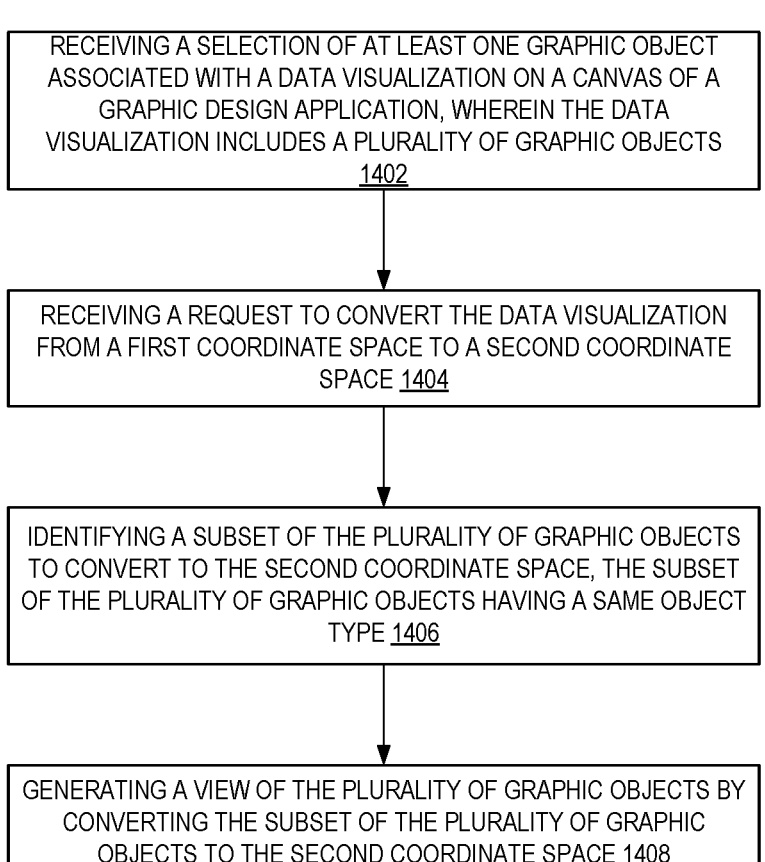

RECEIVING A SELECTION OF AT LEAST ONE GRAPHIC OBJECT ASSOCIATED WITH A DATA VISUALIZATION ON A CANVAS OF A GRAPHIC DESIGN APPLICATION, WHEREIN THE DATA VISUALIZATION INCLUDES A PLURALITY OF GRAPHIC OBJECTS 1402

RECEIVING A REQUEST TO CONVERT THE DATA VISUALIZATION FROM A FIRST COORDINATE SPACE TO A SECOND COORDINATE SPACE 1404

IDENTIFYING A SUBSET OF THE PLURALITY OF GRAPHIC OBJECTS TO CONVERT TO THE SECOND COORDINATE SPACE, THE SUBSET OF THE PLURALITY OF GRAPHIC OBJECTS HAVING A SAME OBJECT TYPE 1406

GENERATING A VIEW OF THE PLURALITY OF GRAPHIC OBJECTS BY CONVERTING THE SUBSET OF THE PLURALITY OF GRAPHIC OBJECTS TO THE SECOND COORDINATE SPACE 1408

*FIG. 14*

CHANGING COORDINATE SYSTEMS FOR DATA BOUND OBJECTS

BACKGROUND

Data visualizations, such as charts, graphs, and other visualizations, provide a schematic representation of data that communicates information about the underlying data visually. Creating a data visualization may be a complex and iterative process as it often involves alternating between data manipulation and visual design aspects of the visualization being crafted. Traditional methods of creating data visualizations include using a visualization template, manually drawing the visualization, or writing computer code to build a unique data visualization.

SUMMARY

Introduced here are techniques/technologies that enable data-bound data visualizations to be readily converted from one coordinate space to another. For example, a data visualization, such as a chart or graph, may be generated by binding data to graphic objects on a digital canvas of a graphic processing application. This allows for data visualizations to be created in, e.g., cartesian space and then converted into, e.g., polar space. The designer can select a data visualization to be converted and then select a conversion operation to begin the conversion of the data visualization between coordinate spaces. The data visualization is automatically divided between the graphic objects that can be converted (e.g., shapes or path objects) and those that should be preserved in the original coordinate space (e.g., text boxes). The coordinates of the objects to be converted are then mapped to the new coordinate space and the resulting data visualization is rendered for the designer to view.

Additionally, in some embodiments, a shadow view of the original data visualization is provided on the canvas along with the converted data visualization. The shadow view acts as a drawing aid for the designer, allowing the designer to edit the data visualization in the shadow view and see those changes reflected automatically in the converted data visualization. This allows for the designer to edit in a more natural coordinate space, rather than making direct edits to the converted data visualization which may not be as intuitive.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 14 illustrates a flowchart of a series of acts in a method of converting coordinate spaces of data bound objects in accordance with one or more embodiments.

DETAILED DESCRIPTION

Figure 1:
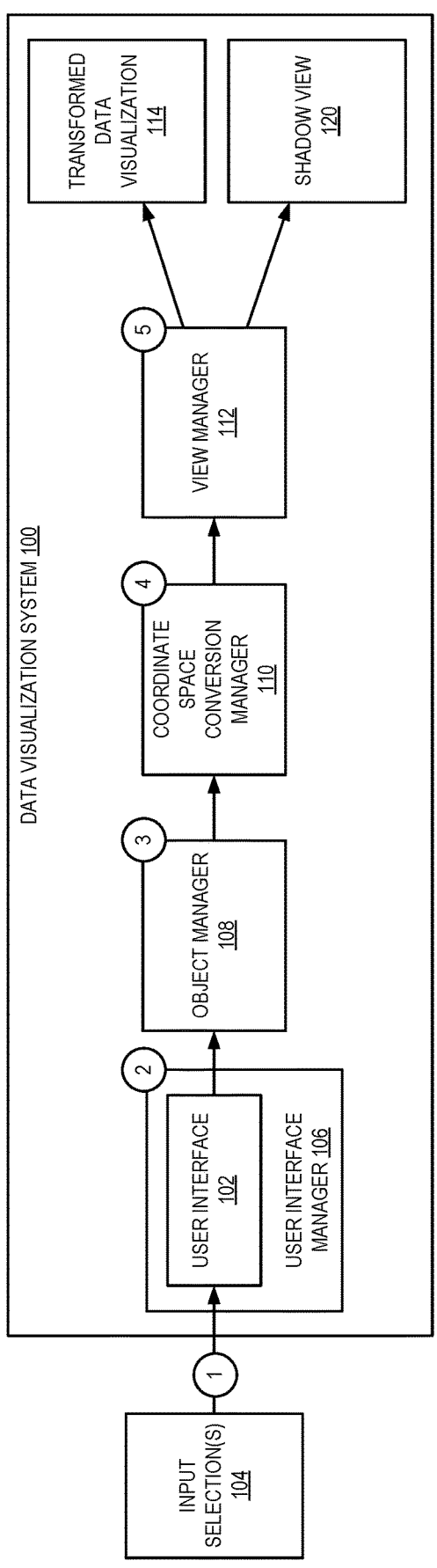
FIG. 1 illustrates a diagram of a process of converting coordinate spaces of data bound objects in accordance with one or more embodiments.

One or more embodiments of the present disclosure are directed to the modification of graphic objects that are bound to data. Data visualizations (e.g., charts, infographics, etc.) are a tool for communicating information about a data set to viewers. Through data visualizations, information can be clearly and creatively presented. Previously, data visualization techniques were manually implemented. For example, charts and graphs that include various graphic objects were manually drawn to match a dataset. Although this provides maximum creativity, as the data visualization is drawn from scratch by the designer, it is slow and not readily applicable to new charts or datasets. For example, if changes to the underlying dataset were made, or if a new visualization were desired, the previous data visualizations had to be thrown out and new ones created. Alternatively, custom code was written to generate data visualizations from a dataset. Although such code could potentially create new data visualizations from different datasets, it requires significant technical ability, both in programming expertise and data science expertise, to create the code.

Furthermore, data visualizations are typically designed in cartesian space. However, not all charts are plotted in cartesian space. For example, pie charts can be plotted in polar space. Creating and editing graphical elements directly in polar space introduces a number of user interface complexities. Additionally, such direct manipulation is not intuitive for most users. As such, there are few, if any, design tools that provide direct manipulation of graphic elements outside of cartesian space. As a result, polar plotted charts are left to be manually generated.

Embodiments enable charts to be constructed using data bound objects in cartesian space and then transform those charts into polar space. For example, the designer creates a graphic object in a graphic design application. Graphic objects may include any image or representation of an object that can be displayed in a graphical user interface (GUI) of a computing device. For example, graphic objects may include shapes, icons, text boxes, images, etc. The designer can then link visual properties of the graphic object to data. The value of the linked data then modifies the visual properties of the graphic object, allowing for different data-driven designs to be quickly and easily created.

Typical design tools enable designers to draw in cartesian space. As such, the initial data visualization (e.g., a chart, etc.) created by the designer is drawn in cartesian space.

However, some chart types and/or data lend themselves to being depicted in other coordinate systems, such as polar space. Accordingly, embodiments enable designers to convert from one coordinate system to another (e.g., cartesian to polar) by selecting a transformation element within the GUI. For example, the designer can select the chart to be transformed and then interact with the transformation element in the GUI. The chart is then transformed from cartesian space to polar space. Not all elements of the chart should be transformed into polar space. For example, text can become illegible if transformed. Accordingly, only some chart elements are transformed while others are repositioned. In some embodiments, there are four ways to convert from cartesian to polar space and the designer can cycle through the options or select a specific transformation.

Additionally, a "shadow view" of the original chart is displayed along with the transformed chart. The shadow view provides a representation of the original chart in cartesian space which the designer can interact with. Any changes made to the shadow view (e.g., rearranging elements, etc.) are then reflected in the transformed chart. This enables designers to intuitively edit their chart design in cartesian space and see the results in polar space. The shadow view is visible to the designer but is not part of the overall design. This way, when the polar chart is published, only the polar chart is rendered.

Unlike prior techniques, which required manually coding a data visualization to be created in polar space, embodiments allow for data visualizations to be created in Cartesian space and transformed into polar space, all intuitively within a single design tool. Additionally, whereas prior techniques required the designer to recode a data visualization to make changes to it, embodiments allow for the polar data visualization to be edited in the design tool either directly or via a shadow view in Cartesian space. This greatly increases the rate at which data visualizations can be created and edited. It also significantly simplifies the data visualization creation pipeline, reducing the amount of resources required to complete a project.

FIG. 1 illustrates a diagram of a process of converting coordinate spaces of data bound objects in accordance with one or more embodiments. As shown in FIG. 1, a data visualization system 100 may enable designers, or other users, to generate data visualizations from underlying source data. Data visualization system 100 may be implemented as part of a graphic design application, such as a vector graphic design application, which enables designers to create various graphic objects (e.g., shapes, lines, text boxes, etc.). In some embodiments, the data visualization system 100 executes on a computing device, such as a PC, laptop, server or any other device including one or more processors capable of executing computer-readable instructions stored on a storage medium.

The data visualization system 100 includes a user interface 102 through which a designer can interact with the data visualization system to create a drawing including graphic objects and bind those graphic objects to data. The designer can create a graphical object by drawing an arbitrary shape in the user interface 102. For example, if the designer is drawing a bar chart, then the designer may use a shape tool to draw a rectangle (e.g., to represent one of the bars of the bar chart). The designer may then provide data to the data visualization system. The data may be input directly into the data visualization system or provided from another source, such as a file including the dataset (e.g., a spreadsheet, database, etc.). Such a file may be imported from a local storage location (e.g., on the same computing device on which the data visualization system is executing) or a remote storage location accessible via a network. The data visualization system can identify one or more variables associated with the data and present the variables to the user (e.g., via a variable or data user interface element, such as a window, overlay, etc.).

The designer can then bind a variable of the data to a visual characteristic of the graphic object. For example, the length of the bar may be bound to a variable from the dataset. The data visualization system may then create multiple new bars and bind them to variable values based on the dataset. For example, if the dataset includes average monthly temperatures for a city, then a temperature variable is identified having twelve values, one for each month. As such, eleven new bars are created and bound to the dataset, with the length of each bar corresponding to the average temperature value for a corresponding month. The resulting chart may also be annotated with various labels. For example, the name of each month may be added to the chart, placed in such a way that the label is associated with its corresponding bar. Likewise, tick marks, scale values, etc. may be added to the axes to indicate the values shown by each bar.

There are a number of benefits to working with data bound objects rather than hard coded, or manually constructed visualizations. For example, if the underlying dataset is changed or updated, the corresponding bound visualization is likewise updated. This saves significant effort that would otherwise be required to update manually constructed charts. Additionally, no specialized coding knowledge is required to create the visualization. Instead, sophisticated data visualizations can be constructed by anyone capable of using a graphic design tool and access to the data to be visualized.

The coordinate space transformations described herein can be performed on a data-bound visualization that the designer has just created, as discussed above, or on a pre-existing data-bound visualization. Given a data-bound visualization, the designer may then choose to transform the visualization from the cartesian space in which it has been drawn into a different coordinate space, such as polar space. In such an instance, at numeral 1, the designer makes one or more input selections 104 via user interface 102. The input selections 104 include selecting all or a portion of the visualization to be transformed and selecting a transformation UI element. For example, the designer may select one or more graphic objects of the visualization (e.g., bars, labels, axes, etc.) and a transformation tool icon presented by the user interface (or vice versa).

At numeral 2, the selected graphic objects are provided to object manager 108 by user interface manager 106. For example, the user interface manager determines a tag or other identifier associated with the selected graphic object(s) and provides it to the object manager 108. In some embodiments, at numeral 3, the object manager 108 identifies the data visualization that has been selected. Where a single graphic object was selected in input selections 104, this includes identifying any other graphic objects that are bound to the same dataset. For example, if one bar of a bar chart is selected, the object manager 108 identifies other bar objects, text boxes (e.g., labels), axes, etc. that are bound to the same dataset or variable of the dataset. In some embodiments, during data visualization generation, each graphic object associated with the data visualization is tagged with an identifier. In such instances, the object manager 108 identifies any other graphic objects having the same tag as the selected graphic object.

Once all of the graphic objects associated with the data visualization to be converted are identified, the object manager 108 provides the graphic objects to the coordinate space conversion manager 110. At numeral 4, the coordinate space conversion manager determines which of the graphic objects are to be converted to polar space. As noted, not all graphic objects are converted from cartesian to polar space when a data visualization is transformed. For example, text data can become illegible when transformed to polar space. Accordingly, the coordinate space conversion manager 110 determines a type of each graphic object and converts those graphic objects having a type that allows for transformation. For example, a "text box" type may not allow for transformation while a "shape" type does. The coordinate space conversion manager 110 then determines polar coordinates for each graphic object being converted. For graphic objects not being transformed, the coordinates of the position of the graphic objects can be computed. This allows for the non-transformed graphic objects to be relocated to a position on the user interface relative to the transformed objects. For example, while the coordinates of the text data itself may not be transformed, the coordinates for the anchor point(s) of the text box may be transformed and the text box relocated using the polar coordinates. For shapes, path objects, etc., that are being transformed, the coordinates of the elements that define those objects (e.g., anchor points, paths, etc.) are converted from cartesian coordinates to polar coordinates. Such conversions may include:

$$r = \sqrt{x^2 + y^2}$$

$$\theta = \tan^{-1}\frac{y}{x}$$

This provides a mapping of cartesian coordinates (x, y) to polar coordinates (r, θ). The new coordinate data for the graphic objects is then provided to view manager 112 for rendering. In some embodiments, the polar conversion can be performed in four ways, by changing the origin point from which the polar coordinates are calculated. The designer can select the desired conversion or cycle through the different conversions (e.g., selecting the transformation icon repeatedly).

At numeral 5, view manager 112 renders the transformed data visualization 114 and a shadow view 120 of the original data visualization. The transformed data visualization 114 includes a plurality of graphic objects, at least some of which have been transformed from cartesian to polar space. As discussed, some graphic objects may be moved based on the transformation, but not transformed, depending on the type of graphic objects. In some embodiments, the transformed data visualization 114 retains all of its other visual characteristics (e.g., color, line width, transparency, etc.) while the shadow view 120 is rendered with a greyed or otherwise subdued appearance. The designer can continue to interact with the shadow view 120 (e.g., by rearranging graphic objects, adding or removing labels, etc.) and these changes are then transformed to polar space and applied to the transformed data visualization 114.

In some embodiments, after the transformation has been performed, the designer can change the transformation to another quadrant. Each time, the coordinate space conversion manager 110 calculates new polar coordinates for the graphic objects and the view manager 112 renders the updated transformed data visualization. In some embodiments, the transformation is animated starting from the original data visualization and ending in the transformed data visualization, as discussed further below.

Accordingly, a designer can readily create a data visualization in cartesian space, transform the data visualization into polar space, and continue editing the data visualization as needed. This provides a simplified interface for creating such data visualizations as data-bound objects, making creation of such data visualization simple and flexible.

Figure 2:
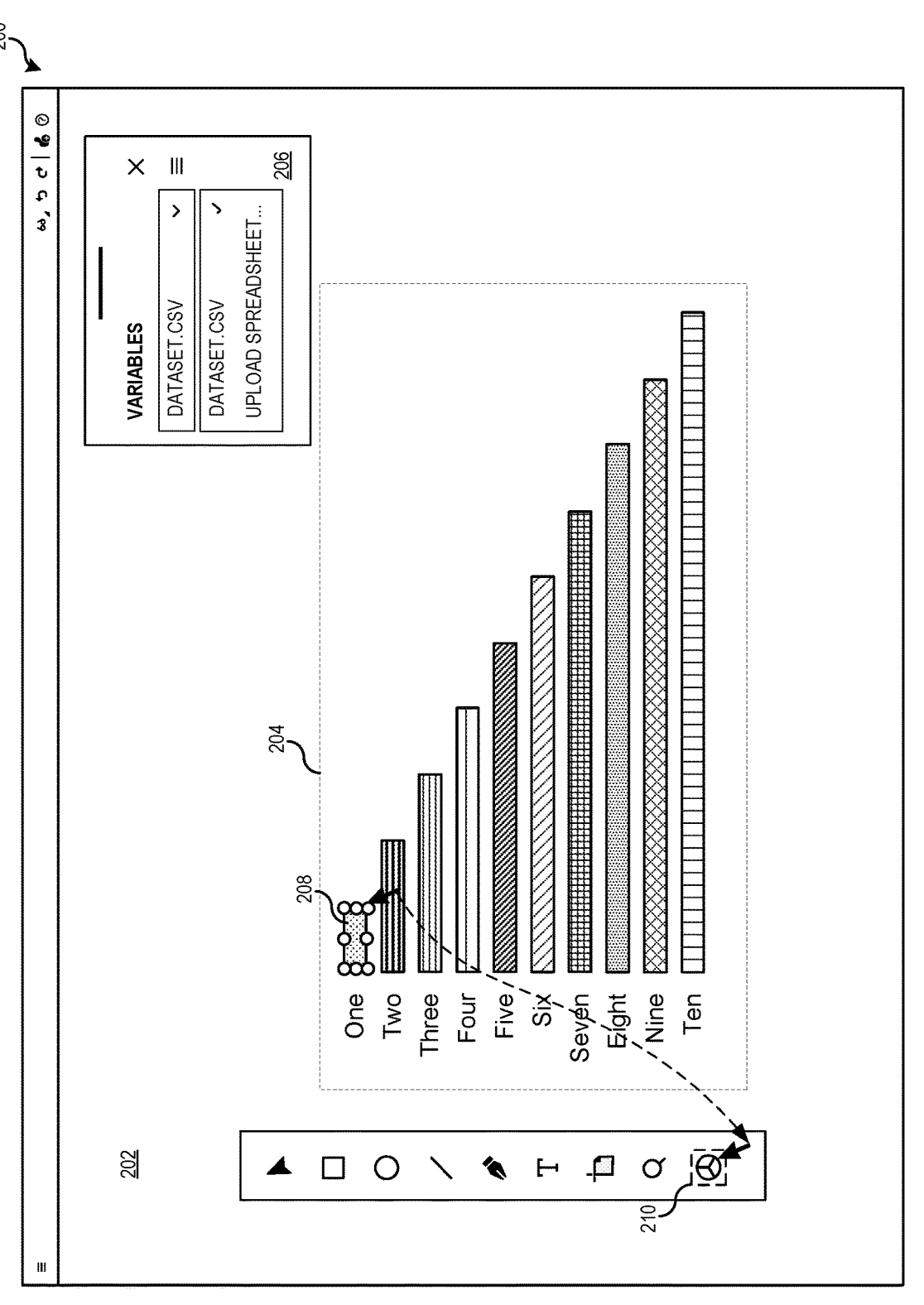
FIG. 2 illustrates a diagram of a user interface that enables conversion of coordinate spaces of data bound objects in accordance with one or more embodiments.

FIG. 2 illustrates a diagram of a user interface 200 that enables conversion of coordinate spaces of data bound objects in accordance with one or more embodiments. As shown in FIG. 2, user interface 200 includes a canvas 202 on which a designer has created a data visualization 204. In this example, the data visualization 204 is a bar chart that includes ten bars representing ten values and ten corresponding labels for each bar. The bar chart is drawn in cartesian space and is bound to data in dataset.csv, as shown in variables panel 206. In the example of FIG. 2, the bar chart includes graphic objects of two types: text boxes corresponding to the labels, and shapes (or path objects) corresponding to the bars.

To convert the bar chart from cartesian space to polar space, the designer selects at least a portion of the bar chart. For example, as shown in FIG. 2, the designer selects one bar 208. Such selection may include moving a cursor (e.g., via a mouse or other pointing device) and clicking on the bar, tapping the bar via a touchscreen interface, or other selection techniques (e.g., gaze detection, voice commands, etc.). In some embodiments, upon selection, variables panel 206 shows the data to which the selected graphic object is bound. After selecting a portion of the bar chart, the designer then selects a polar transform icon 210. This causes the entire data visualization associated with the selected bar to be transformed from cartesian space to polar space, as shown below.

Figure 3:
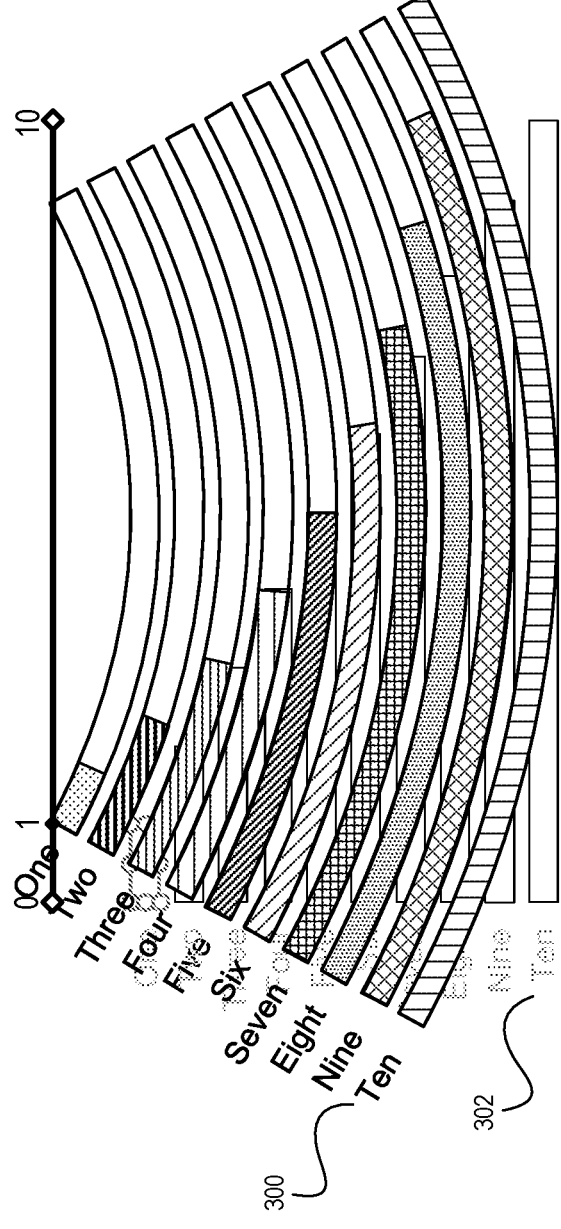
FIGS. 3-5 illustrate an example of converting a chart from a first coordinate space to a second coordinate space in accordance with one or more embodiments.
Figure 4:
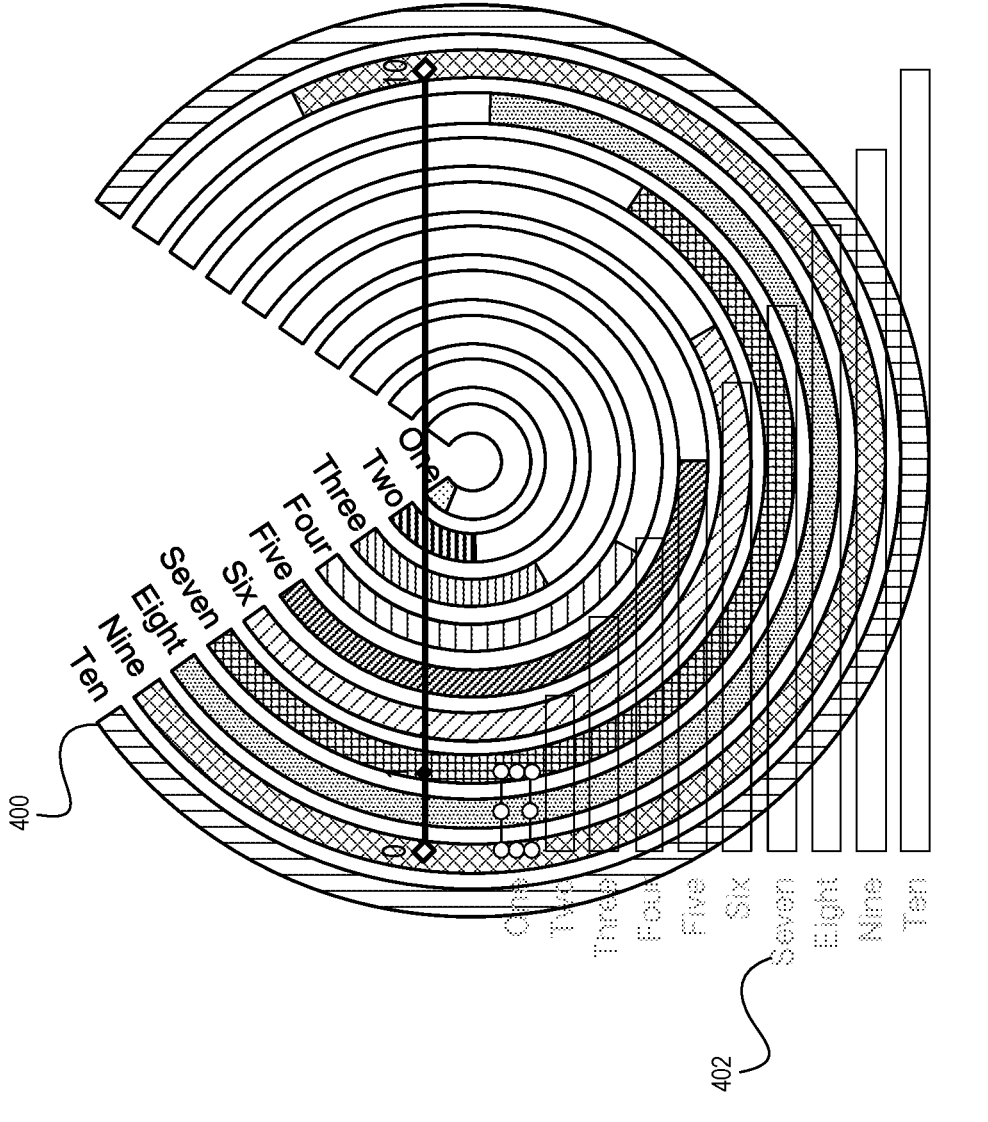
Figure 5:
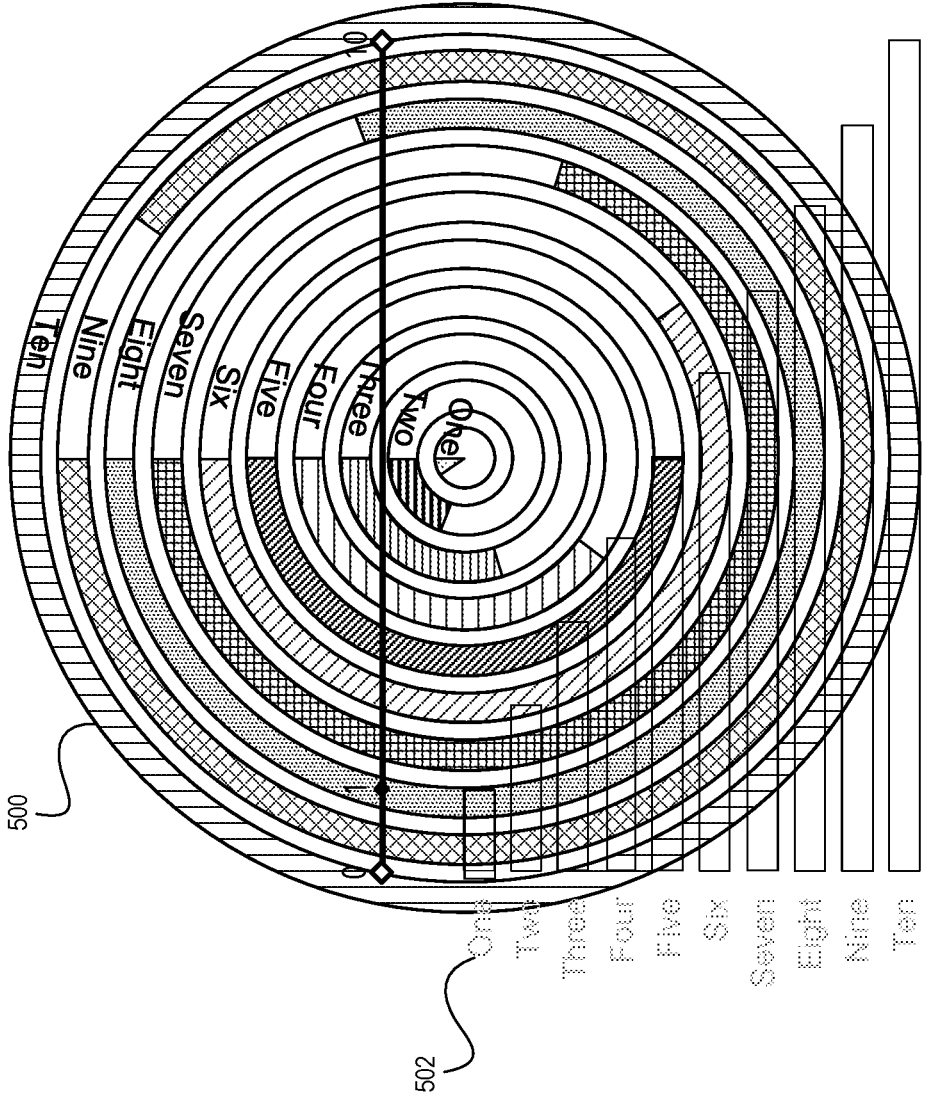

FIGS. 3-5 illustrate an example of converting a chart from a first coordinate space to a second coordinate space in accordance with one or more embodiments. As discussed, when a data visualization is transformed from one coordinate space to another (e.g., cartesian to polar), the transformation may be animated. FIGS. 3-5 depict intermediate views of the data visualization as the transformation occurs.

In the example of FIG. 3, the bar chart of FIG. 2 has begun its transformation from cartesian space to polar space. As discussed, the other bars that were not selected have been identified as belonging to the same data visualization as the selected bar. Additionally, the labels corresponding to the bars have been identified. At this stage, 300 the bar chart is now partially curved, as the coordinates are transformed about a central pole. As discussed, not all types of graphic objects are transformed into polar space. For example, while the bars are being transformed into polar space, the text labels are having their positions updated such that they remain at one end of their respective bars, but the text itself has not been transformed. Additionally, the original chart remains as shadow view 302. As shown, the shadow view is rendered in the position of the original chart in cartesian space. In some embodiments, the shadow view is depicted in lighter tones or otherwise having a visualization that indicates it is distinct from the rest of the drawing.

As shown in FIG. 4, the is transformation is nearly complete. The bars of the chart 400 continue to curve around the central pole and the position of the labels continue to track the end of the bars. Additionally, the shadow view 402 remains unchanged. In the example of FIG. 5, the polar transformation is complete. The bar chart of FIG. 2 is now a polar "bar" chart where each bar is shown as a ring and the labels are left overlapping the rings of the polar bar chart. In this example, the polar conversion was performed using the top center point of the data visualization as the origin from which the polar coordinates were calculated. Alternative origin positions result in different polar representations of the same data visualization, as shown below.

Figure 6:
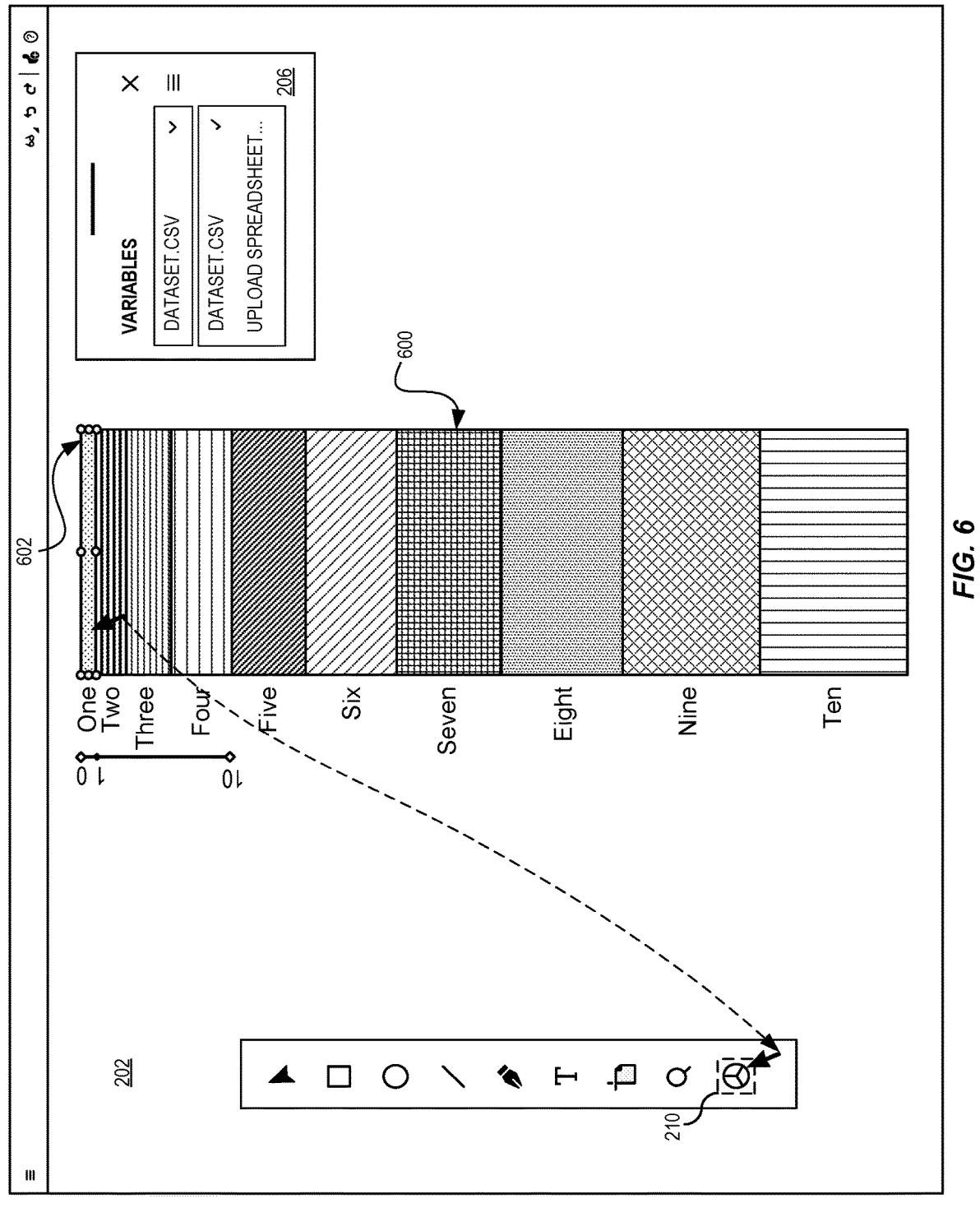
FIG. 6 illustrates an example chart to be converted to a new coordinate space in accordance with one or more embodiments.

FIG. 6 illustrates an example chart to be converted to a new coordinate space in accordance with one or more embodiments. FIG. 6 shows another data visualization 600 representing the same data as in FIG. 2. Instead of the bar chart of FIG. 2, in which the data was bound to a length parameter of the bar graphic objects, in the example of FIG. 6 the data is bound to a width parameter of the bar graphic objects. Similar to FIG. 2, the chart of FIG. 6 includes two types of graphic objects: text boxes (corresponding to the labels "one" to "ten") and the bars (e.g., shapes or path objects). As shown in FIG. 6, a first bar 602 is selected and variables panel 206 shows it is bound to dataset.csv. The designer then selects transformation icon 210 and the data visualization 600 is then converted into polar space, as discussed above.

As discussed, the polar conversion can be performed in multiple ways by varying the origin from which the polar coordinates are calculated. Four examples of polar conversions are discussed in the following figures.

Figure 7:
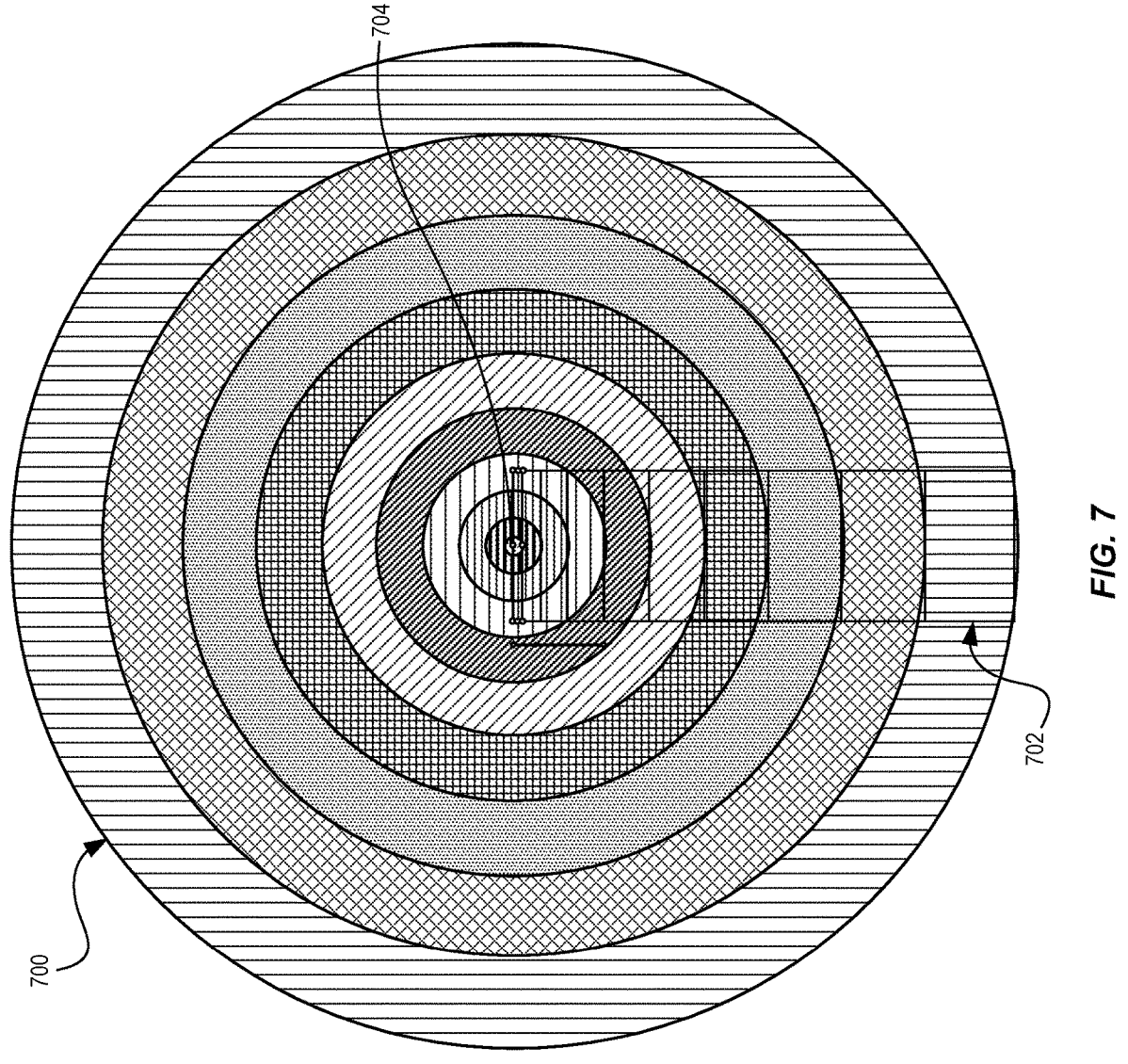
FIGS. 7-10 illustrate example conversions of the chart to the new coordinate space in accordance with one or more embodiments.

FIGS. 7-10 illustrate example conversions of the chart to the new coordinate space in accordance with one or more embodiments. In the example of FIG. 7, the data visualization 600 of FIG. 6 has been transformed into polar data visualization 700 and shadow view 702 corresponding to the original data visualization is also shown. In the example of FIG. 7, the origin is the top center point 704 of the original data visualization. In this example, each bar has been transformed into a ring, with the smallest bar corresponding to the innermost ring and the largest bar corresponding to the outermost ring. The width of each ring is still bound to the data values as in the original visualization.

Figure 8:
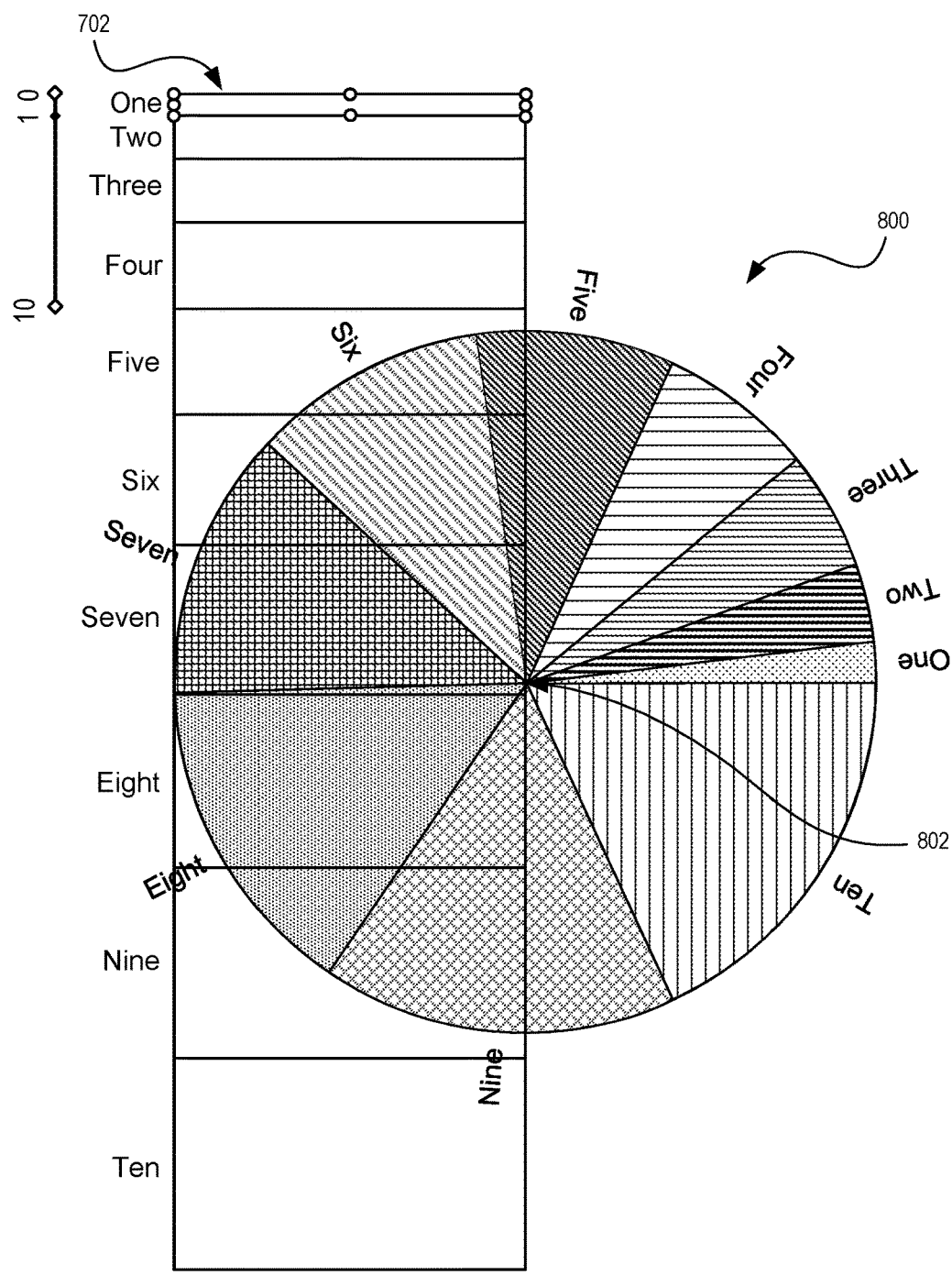
Figure 9:
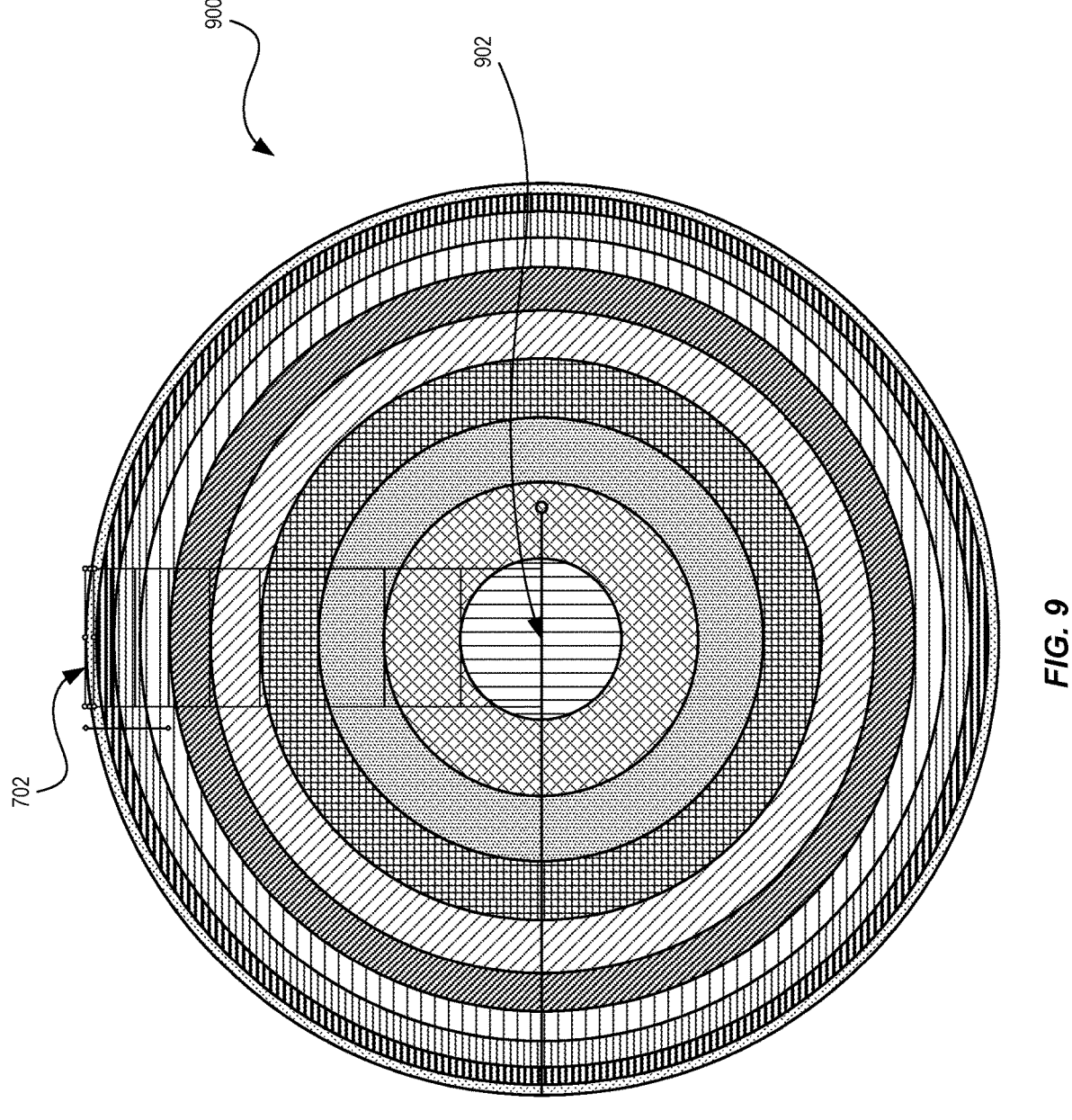
Figure 10:
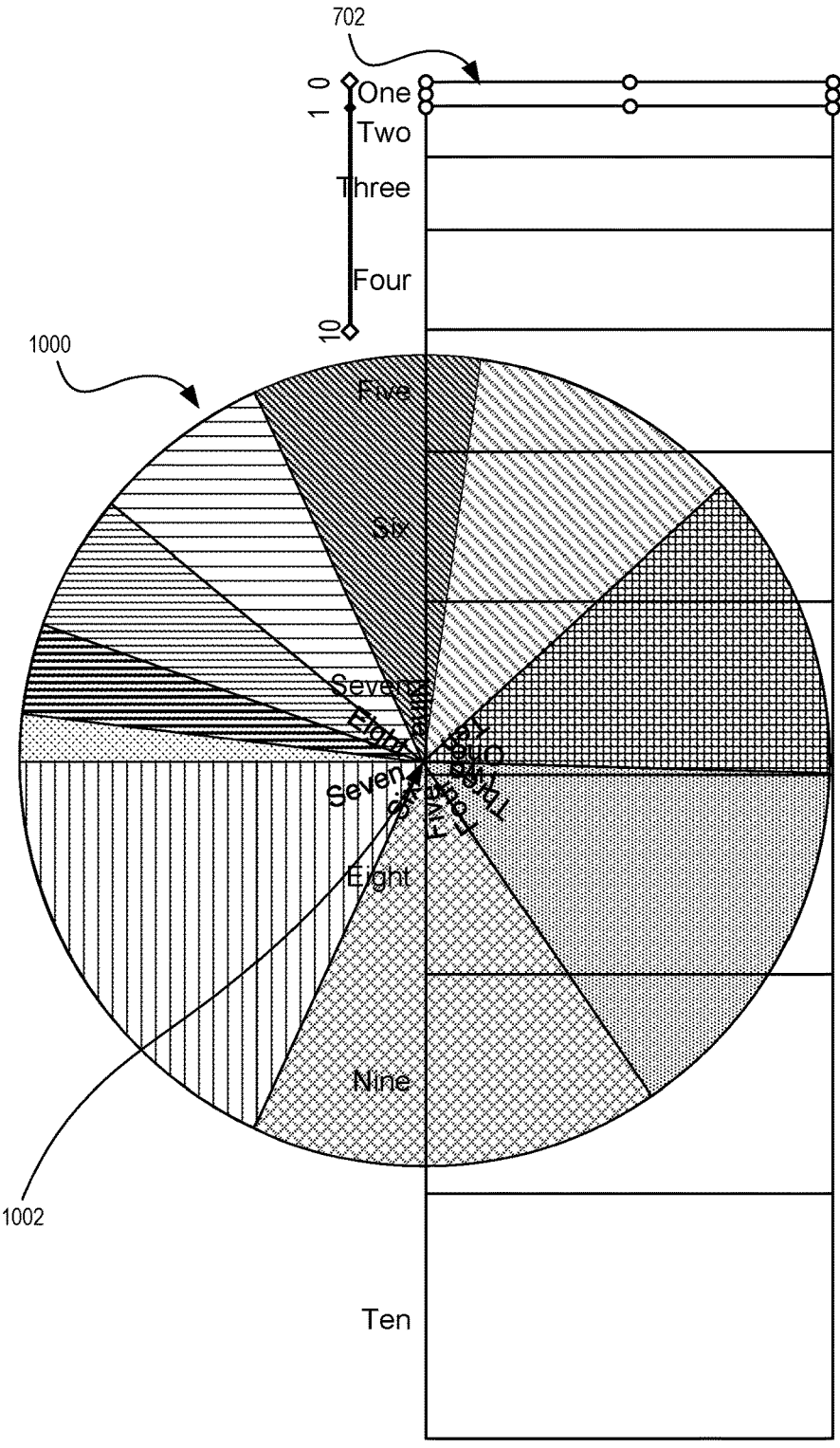

FIG. 8 shows a second polar visualization 800 generated based on the data visualization 600 of FIG. 6. In the example of FIG. 8, the origin of the polar transformation is the center right point 802 of the original data visualization. This results in the pie chart shape depicted in FIG. 8 with the labels on the outside of the chart. FIG. 9 shows a third polar visualization 900 generated based on the data visualization 600 of FIG. 6. In the example of FIG. 9, the origin of the polar transformation is the center bottom point 902 of the original data visualization. This results in a reverse of the first polar visualization shown in FIG. 7. As shown in FIG. 9, the innermost ring now corresponds to the largest bar of the original data visualization 600 while the outermost ring corresponds to the smallest bar of the original data visualization. FIG. 10 shows a fourth polar visualization 1000 generated based on the data visualization 600 of FIG. 6. In the example of FIG. 10, the origin of the polar transformation is the center bottom point 1002 of the original data visualization. This results in a reverse of the second polar visualization shown in FIG. 8. As shown in FIG. 10, the resulting polar data visualization is a pie chart and in this example the labels are located around the center of the pie chart.

Figure 11:
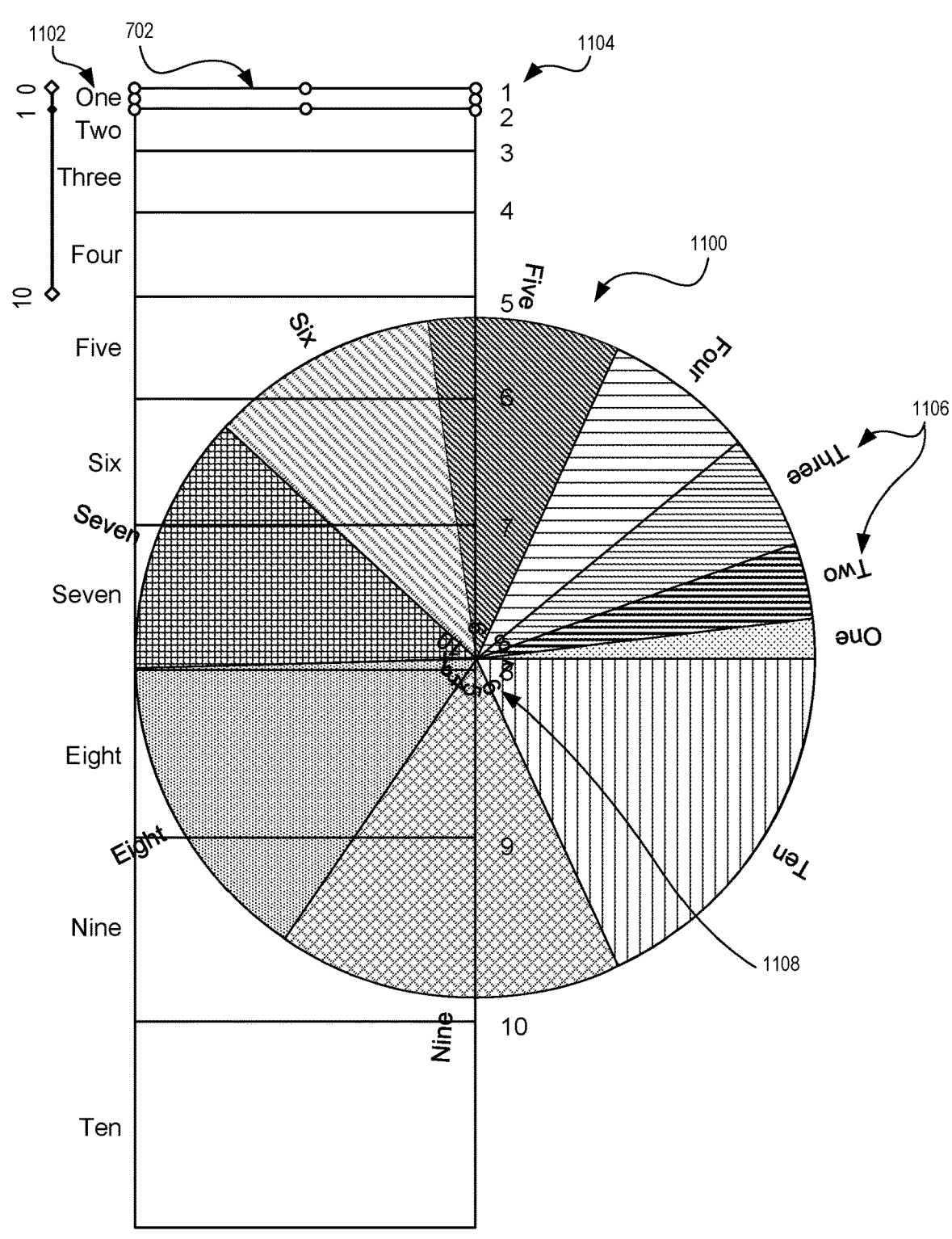
FIGS. 11-12 illustrate an example of interacting with the shadow view in a first coordinate space to modify the chart in a second coordinate space in accordance with one or more embodiments.
Figure 12:
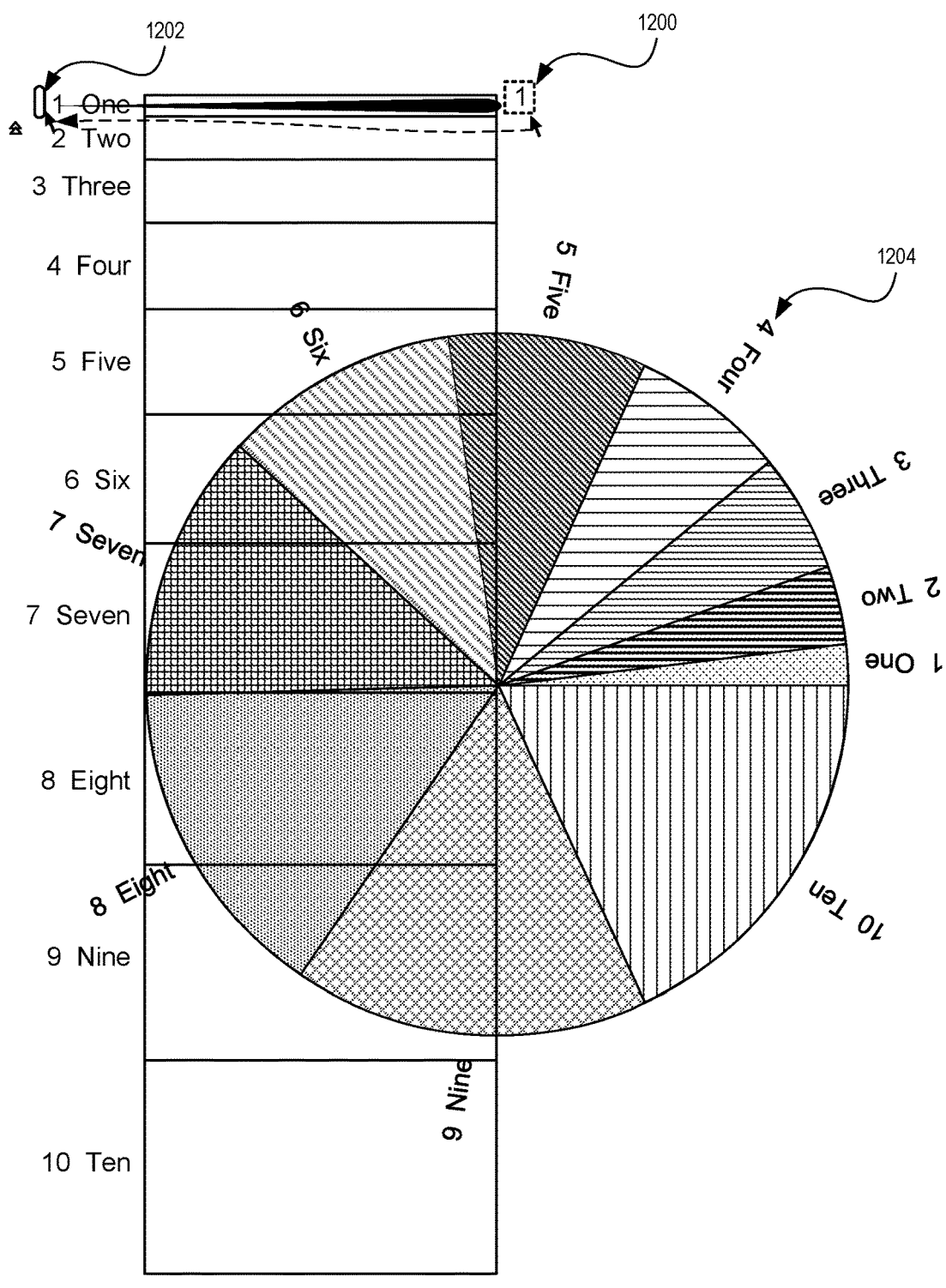

FIGS. 11-12 illustrate an example of interacting with the shadow view in a first coordinate space to modify the chart in a second coordinate space. As discussed, when a data visualization is transformed from one coordinate space to another, a shadow view of the original data visualization is retained. This allows for the designer to modify the transformed chart in the original coordinate space, which is typically more intuitive than editing directly in the transformed coordinate space. In the example of FIG. 11, the data visualization 600 of FIG. 6 is shown transformed into polar space. Upon transforming the data visualization into polar space, polar data visualization 1100 is created along with shadow view 702. In this instance, the data visualization 600 includes left-side labels 1102 of "one" to "ten" and right-side numerical labels 1104 of "1" to "10". As shown, these labels have been moved such that they remain in the same relative position to their transformed blocks. For example, the left-side labels are now positioned on the outside of the polar data visualization and the right-side numerical labels are now positioned around the origin of the polar data visualization. This presents a less-than-ideal situation in which the right-side numerical labels are grouped closely together, making it difficult to read the labels and determine which block they are each associated with. As such, the data visualization needs to be edited to improve its appearance and legibility.

As shown in FIG. 12, the designer interacts with the shadow view to edit the polar data visualization. In the example of FIG. 12, the designer selects a right-side numerical label 1200 and moves it to the left side of the shadow view. In various embodiments, selection and movement of the label may include clicking and dragging the label with a cursor using a pointing device, tapping and dragging the label via a touchscreen interface, etc. As the designer moves the label in the shadow view, the position of the label in polar space is determined and the corresponding label in the polar data visualization is updated accordingly. As such, the changes made to the shadow view are reflected in real time in the polar data visualization, allowing for intuitive editing in a different coordinate space.

Figure 13:
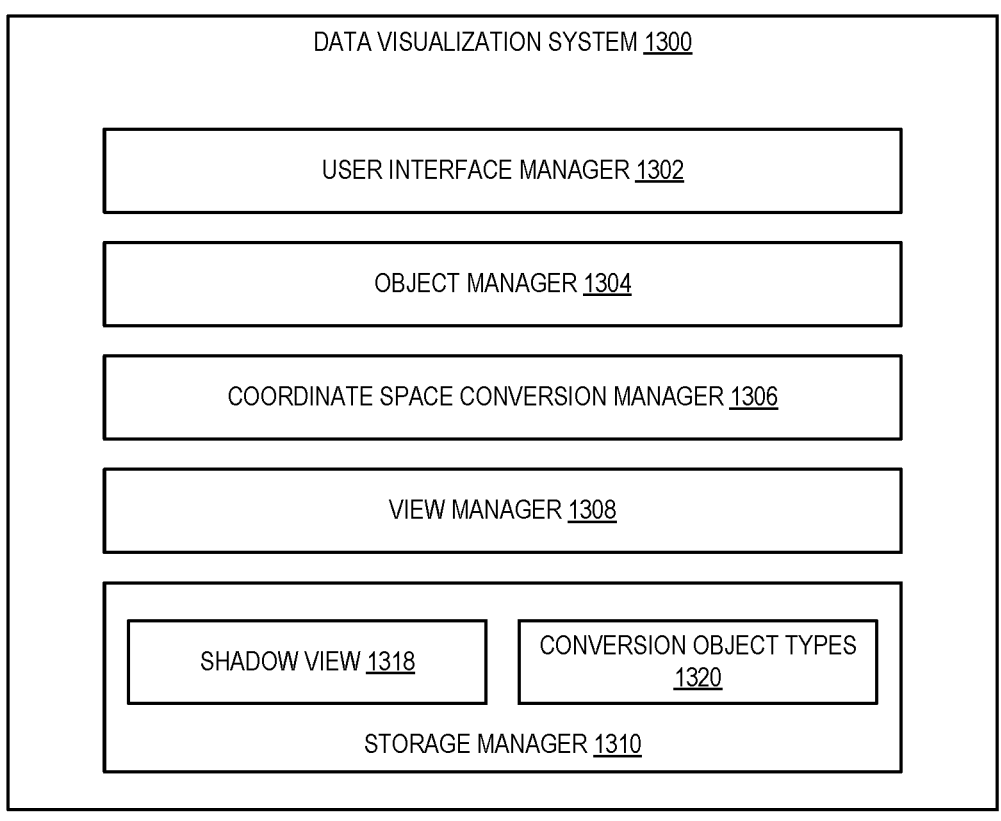
FIG. 13 illustrates a schematic diagram of a data visualization system in accordance with one or more embodiments.

FIG. 13 illustrates a schematic diagram of data visualization system 1300 (e.g., "data visualization system" described above) in accordance with one or more embodiments. As shown, the data visualization system 1300 may include, but is not limited to, user interface manager 1302, object manager 1304, coordinate space conversion manager 1306, view manager 1308, and storage manager 1310. The storage manager 1310 includes shadow view 1318 and conversion object types 1320.

As illustrated in FIG. 13, the data visualization system 1300 includes a user interface manager 1302. For example, the user interface manager 1302 allows users to create graphic objects and bind them to data to create data visualizations. In some embodiments, the user interface manager 1302 provides a user interface through which the user can interact with the data visualization system and individual data visualizations, as discussed above. Alternatively, or additionally, the user interface may enable the user to download data visualizations from a local or remote storage location (e.g., by providing an address (e.g., a URL or other endpoint) associated with a storage location).

Additionally, the user interface manager 1302 allows users to request the data visualization system 1300 to transform a data visualization from one coordinate space to another. For example, data visualizations, like other graphic designs, are typically created in cartesian space. The designer can select a data visualization through the user interface (e.g., by selecting all or a portion of the graphic objects that make up the data visualization) and request that the data visualization system transform the selected data visualization into another coordinate space, such as polar coordinate space. The transformation request can be received via a user interface element, such as a transformation icon. Alternatively, the transformation request can be made via a menu, panel, or other user interface element. In some embodiments, the transformation is animated and rendered via the user interface. Once complete, the resulting polar data visualization is rendered via the user interface and can be further interacted with/edited by the designer.

As illustrated in FIG. 13, the data visualization system 1300 includes an object manager 1304. The object manager 1304 receives the graphic object, or an identifier associated with the graphic object, and determines if there are any additional graphic objects associated with the data visualization. As discussed, the object manager 1304 can identify other graphic objects bound to the same dataset, other graphic objects tagged or otherwise associated with the same data visualization, etc. Once all of the relevant graphic objects have been identified, the object manager 1304 provides them to coordinate space conversion manager 1306.

As illustrated in FIG. 13, the data visualization system 1300 includes a coordinate space conversion manager 1306. The coordinate space conversion manager 1306 is responsible for identifying which graphic objects of a data visualization are to be transformed and for transforming those objects. In some embodiments, only specific conversion object types 1320 are converted from one coordinate space to another, while object types not included in conversion object types 1320 are just repositioned. For example, text boxes may be repositioned but not converted as the conversion process makes the text unreadable. However, by repositioning the text boxes, they can retain their relative position in the converted data visualization. For graphic objects having a type belonging to the conversion object types 1320, the coordinate space conversion manager 1306 determines new coordinates, in the new coordinate space, for the elements that define those objects (e.g., anchor points, paths, etc.). For example, in some embodiments, the coordinates for these elements in cartesian space are converted from cartesian coordinates to polar coordinates. Additionally, the origin can be varied to obtain different appearances of the converted data visualization, as discussed above.

As illustrated in FIG. 13, the data visualization system 1300 includes a view manager 1308. Once converted, view manager 1308 is responsible for rendering the resulting polar data visualization as well as shadow view 1318. As discussed, shadow view 1318 may represent the original data visualization, which is made visible to the designer, but which is not part of the visible design (e.g., the shadow view is not printed or otherwise published with the rest of the canvas, but instead serves as a drawing/editing aid). As discussed, the designer can interact with the shadow view to make changes to the polar data visualization. For example, if a label or other object or element of the shadow view is moved, then coordinate space conversion manager 1306 can calculate new coordinates for the moved object (either its position or its defining elements, depending on object type) and the polar data visualization is updated with the changed objects by the view manager 1308. This allows for the polar data visualization to be modified in real time, indirectly, using the shadow view.

As illustrated in FIG. 13, the data visualization system 1300 also includes the storage manager 1310. The storage manager 1310 maintains data for the data visualization system 1300. The storage manager 1310 can maintain data of any type, size, or kind as necessary to perform the functions of the data visualization system 1300. The storage manager 1310, as shown in FIG. 13, includes the shadow view 1318. The shadow view 1318 can include a representation of the original data visualization, as discussed in additional detail above. In particular, in one or more embodiments, the shadow view 1318 is a copy of the original data visualization, which is provided as a drawing aid, and not part of the visible canvas of the user interface.

As further illustrated in FIG. 13, the storage manager 1310 also includes conversion object types 1320. Conversion object types 1320 can include identifiers for one or more object types that can be converted from one coordinate space to another. In some embodiments, the conversion object types 1320 indicates object types that cannot be converted. Additionally, or alternatively, the conversion object types 1320 indicates object types for specific conversions (e.g., cartesian to polar, polar to cartesian, etc.). In some embodiments, conversion object types 1320 indicates particular object types by name or other identifier.

Each of the components 1302-1310 of the data visualization system 1300 and their corresponding elements (as shown in FIG. 13) may be in communication with one another using any suitable communication technologies. It will be recognized that although components 1302-1310 and their corresponding elements are shown to be separate in FIG. 13, any of components 1302-1310 and their corresponding elements may be combined into fewer components, such as into a single facility or module, divided into more components, or configured into different components as may serve a particular embodiment.

The components 1302-1310 and their corresponding elements can comprise software, hardware, or both. For example, the components 1302-1310 and their corresponding elements can comprise one or more instructions stored on a computer-readable storage medium and executable by processors of one or more computing devices. When executed by the one or more processors, the computer-executable instructions of the data visualization system 1300 can cause a client device and/or a server device to perform the methods described herein. Alternatively, the components 1302-1310 and their corresponding elements can comprise hardware, such as a special purpose processing device to perform a certain function or group of functions. Additionally, the components 1302-1310 and their corresponding elements can comprise a combination of computer-executable instructions and hardware.

Furthermore, the components 1302-1310 of the data visualization system 1300 may, for example, be implemented as one or more stand-alone applications, as one or more modules of an application, as one or more plug-ins, as one or more library functions or functions that may be called by other applications, and/or as a cloud-computing model. Thus, the components 1302-1310 of the data visualization system 1300 may be implemented as a stand-alone application, such as a desktop or mobile application. Furthermore, the components 1302-1310 of the data visualization system 1300 may be implemented as one or more web-based applications hosted on a remote server. Alternatively, or additionally, the components of the data visualization system 1300 may be implemented in a suite of mobile device applications or "apps."

FIGS. 1-13, the corresponding text, and the examples, provide a number of different systems and devices that allows a user to change coordinate systems for data bound objects. In addition to the foregoing, embodiments can also be described in terms of flowcharts comprising acts and steps in a method for accomplishing a particular result. For example, FIG. 14 illustrates a flowchart of an exemplary method in accordance with one or more embodiments. The method described in relation to FIG. 14 may be performed with fewer or more steps/acts or the steps/acts may be performed in differing orders. Additionally, the steps/acts described herein may be repeated or performed in parallel with one another or in parallel with different instances of the same or similar steps/acts.

FIG. 14 illustrates a flowchart 1400 of a series of acts in a method of converting coordinate spaces of data bound objects in accordance with one or more embodiments. In one or more embodiments, the method 1400 is performed in a digital medium environment that includes the data visualization system 1300. The method 1400 is intended to be illustrative of one or more methods in accordance with the present disclosure and is not intended to limit potential embodiments. Alternative embodiments can include additional, fewer, or different steps than those articulated in FIG. 14.

As illustrated in FIG. 14, the method 1400 includes an act 1402 of receiving a selection of at least one graphic object associated with a data visualization on a canvas of a graphic design application, wherein the data visualization includes a plurality of graphic objects. The data visualization may include a chart, graph, or other visual representation of one or more datasets. As discussed, in some embodiments the user selects a graphic object (e.g., a text box, a shape, a path object, etc.) using a mouse or other pointing device, touch-screen interface, etc.

As illustrated in FIG. 14, the method 1400 also includes an act 1404 of receiving a request to convert the data visualization from a first coordinate space to a second coordinate space. In some embodiments, the first coordinate space is a Cartesian coordinate space and wherein the second coordinate space is a polar coordinate space. As discussed, in some embodiments the user selects a GUI element (e.g., an icon, panel, menu item, etc.) associated with a coordinate space conversion operation. For example, a GUI icon may be associated with performing cartesian to polar conversions. The user may select the icon, thereby requesting the conversion of the data visualization, via the GUI, as discussed.

As illustrated in FIG. 14, the method 1400 also includes an act 1406 of identifying a subset of the plurality of graphic objects to convert to the second coordinate space, the subset of the plurality of graphic objects having a same object type. As discussed, not all graphic objects are converted to the new coordinate space. For example, text when converted becomes difficult or impossible to read. As such, text boxes may be an object type excluded from conversions, while shapes, path objects, etc. may be graphic object types that can belong to the subset of graphic objects to be converted.

As illustrated in FIG. 14, the method 1400 also includes an act 1408 of generating a view of the plurality of graphic objects by converting the subset of the plurality of graphic objects to the second coordinate space. Once the graphic objects to be converted have been identified, the coordinates of the graphic objects are mapped from the first coordinate space to the second coordinate space. For example, anchor points, paths, or other elements that define the shapes are mapped into the new coordinate space and the resulting mapped objects are then rendered as the new view of the graphic objects.

In some embodiments, generating a view of the plurality of graphic objects by converting the subset of the plurality of graphic objects to the second coordinate space, further includes using a first mapping to convert the subset of the plurality of graphic objects from the first coordinate space to the second coordinate space. In some embodiments, the method further includes receiving a second request to convert the plurality of objects to the second coordinate space, and using a second mapping to convert the subset of the plurality of graphic objects from the first coordinate space to the second coordinate space. In some embodiments, the first mapping and second mapping have different origin points in the second coordinate space.

In some embodiments, the method further includes displaying a second view of the plurality of graphic objects in the first coordinate space adjacent to the converted subset of the plurality of graphic objects. As discussed, this shadow view may be a representation of the original data visualization in the first coordinate system. The shadow view can be edited by the designer and those changes are then reflected in the converted view of the data visualization. For example, in some embodiments, the method further includes receiving a change to at least one graphic object of the second view of the plurality of objects, converting the change from the first coordinate space to the second coordinate space, and updating the view of the plurality of graphic objects based on the converted change.

In some embodiments, when the data visualization is converted, the conversion process is animated. For example, in some embodiments, the method further includes displaying an animated transition of the conversion from the first coordinate space to the second coordinate space.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 15:
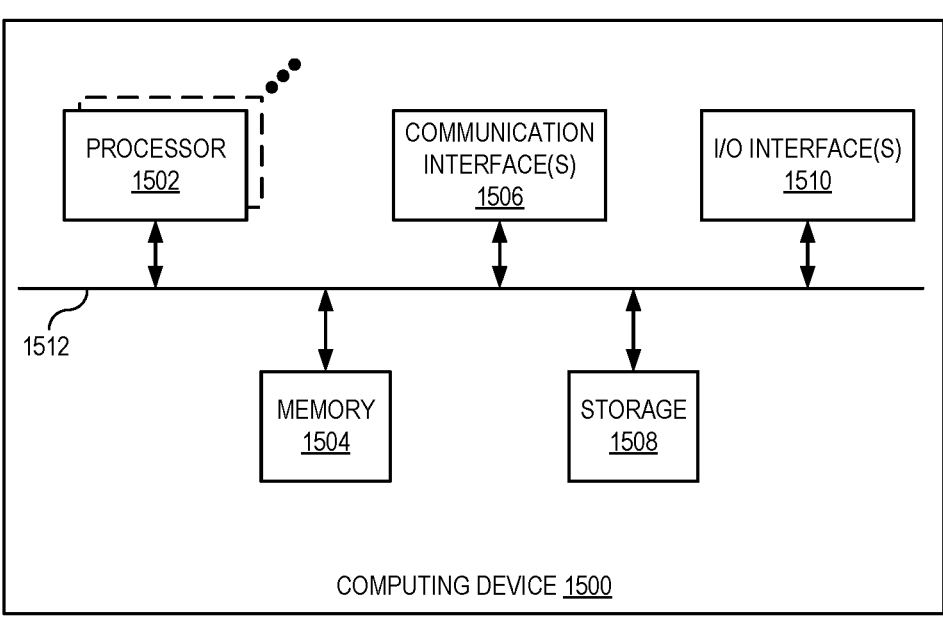
FIG. 15 illustrates a block diagram of an exemplary computing device in accordance with one or more embodiments.

FIG. 15 illustrates, in block diagram form, an exemplary computing device 1500 that may be configured to perform one or more of the processes described above. One will appreciate that one or more computing devices such as the computing device 1500 may implement the data visualization system. As shown by FIG. 15, the computing device can comprise a processor 1502, memory 1504, one or more communication interfaces 1506, a storage device 1508, and one or more I/O devices/interfaces 1510. In certain embodiments, the computing device 1500 can include fewer or more components than those shown in FIG. 15. Components of computing device 1500 shown in FIG. 15 will now be described in additional detail.

In particular embodiments, processor(s) 1502 includes hardware for executing instructions, such as those making up a computer program. As an example, and not by way of limitation, to execute instructions, processor(s) 1502 may retrieve (or fetch) the instructions from an internal register, an internal cache, memory 1504, or a storage device 1508 and decode and execute them. In various embodiments, the processor(s) 1502 may include one or more central processing units (CPUs), graphics processing units (GPUs), field programmable gate arrays (FPGAs), systems on chip (SoC), or other processor(s) or combinations of processors.

The computing device 1500 includes memory 1504, which is coupled to the processor(s) 1502. The memory 1504 may be used for storing data, metadata, and programs for execution by the processor(s). The memory 1504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1504 may be internal or distributed memory.

The computing device 1500 can further include one or more communication interfaces 1506. A communication interface 1506 can include hardware, software, or both. The communication interface 1506 can provide one or more interfaces for communication (such as, for example, packet-based communication) between the computing device and one or more other computing devices 1500 or one or more networks. As an example and not by way of limitation, communication interface 1506 may include a network interface controller (NIC) or network adapter for communicating with an Ethernet or other wire-based network or a wireless NIC (WNIC) or wireless adapter for communicating with a wireless network, such as a WI-FI. The computing device 1500 can further include a bus 1512. The bus 1512 can comprise hardware, software, or both that couples components of computing device 1500 to each other.

The computing device 1500 includes a storage device 1508 includes storage for storing data or instructions. As an example, and not by way of limitation, storage device 1508 can comprise a non-transitory storage medium described above. The storage device 1508 may include a hard disk drive (HDD), flash memory, a Universal Serial Bus (USB) drive or a combination these or other storage devices. The computing device 1500 also includes one or more input or output ("I/O") devices/interfaces 1510, which are provided to allow a user to provide input to (such as user strokes), receive output from, and otherwise transfer data to and from the computing device 1500. These I/O devices/interfaces 1510 may include a mouse, keypad or a keyboard, a touch screen, camera, optical scanner, network interface, modem, other known I/O devices or a combination of such I/O devices/interfaces 1510. The touch screen may be activated with a stylus or a finger.

The I/O devices/interfaces 1510 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1510 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a selection of at least one graphic object associated with a first data visualization on a canvas of a graphic design application, wherein the first data visualization includes a plurality of graphic objects;
   receiving a request to convert the first data visualization in a first coordinate space to a second data visualization in a second coordinate space;
   identifying a subset of the plurality of graphic objects in the first data visualization to convert to the second coordinate space, the subset of the plurality of graphic objects having a same object type;

generating a view of the plurality of graphic objects in the second data visualization by converting the subset of the plurality of graphic objects to the second coordinate space;
   displaying the second data visualization in the second coordinate space as a shadow view superimposed on the first data visualization in the first coordinate space; and
   automatically updating the second data visualization in the second coordinate space in real time by converting a modification to a graphic object in the plurality of graphic objects in the first data visualization in the first coordinate space to the second coordinate space.

2. The method of claim 1, wherein automatically updating the second data visualization in the second coordinate space by converting the modification to the graphic object in the plurality of graphic objects in the first data visualization in the first coordinate space to the second coordinate space further comprises:
   receiving the modification to the graphic object of the plurality of graphic objects of the first data visualization;
   converting the modification from the first coordinate space to the second coordinate space; and
   updating the view of the plurality of graphic objects in the second data visualization based on the converted modification.

3. The method of claim 1, wherein generating a view of the plurality of graphic objects in the second data visualization by converting the subset of the plurality of graphic objects to the second coordinate space, further comprises:
   using a first mapping to convert the subset of the plurality of graphic objects from the first coordinate space to the second coordinate space.

4. The method of claim 3, further comprising:
   receiving a second request to convert the plurality of graphic objects to the second coordinate space; and
   using a second mapping to convert the subset of the plurality of graphic objects from the first coordinate space to the second coordinate space.

5. The method of claim 4, wherein the first mapping and second mapping have different origin points in the second coordinate space.

6. The method of claim 1, further comprising:
   displaying an animated transition of the conversion from the first coordinate space to the second coordinate space.

7. The method of claim 1, wherein the first coordinate space is a Cartesian coordinate space and wherein the second coordinate space is a polar coordinate space.

8. A non-transitory computer-readable medium storing executable instructions, which when executed by a processing device, cause the processing device to perform operations comprising:
   receiving a selection of at least one graphic object associated with a first data visualization on a canvas of a graphic design application, wherein the first data visualization includes a plurality of graphic objects;
   receiving a request to convert the first data visualization in a first coordinate space to a second data visualization in a second coordinate space;
   identifying a subset of the plurality of graphic objects in the first data visualization to convert to the second coordinate space, the subset of the plurality of graphic objects having a same object type;

generating a view of the plurality of graphic objects in the second data visualization by converting the subset of the plurality of graphic objects to the second coordinate space;

displaying the second data visualization in the second coordinate space as a shadow view superimposed on the first data visualization in the first coordinate space; and automatically updating the second data visualization in the second coordinate space in real time by converting a modification to a graphic object in the plurality of graphic objects in the first data visualization in the first coordinate space to the second coordinate space.

9. The non-transitory computer-readable medium of claim 8, wherein automatically updating the second data visualization in the second coordinate space by converting the modification to the graphic object in the plurality of graphic objects in the first data visualization in the first coordinate space to the second coordinate space further comprises:

receiving the modification to the graphic object of the plurality of graphic objects of the first data visualization;

converting the modification from the first coordinate space to the second coordinate space; and updating the view of the plurality of graphic objects in the second data visualization based on the converted modification.

10. The non-transitory computer-readable medium of claim 8, wherein generating a view of the plurality of graphic objects in the second data visualization by converting the subset of the plurality of graphic objects to the second coordinate space, further comprises:

using a first mapping to convert the subset of the plurality of graphic objects from the first coordinate space to the second coordinate space.

11. The non-transitory computer-readable medium of claim 10, further comprising:

receiving a second request to convert the plurality of graphic objects to the second coordinate space; and using a second mapping to convert the subset of the plurality of graphic objects from the first coordinate space to the second coordinate space.

12. The non-transitory computer-readable medium of claim 11, wherein the first mapping and second mapping have different origin points in the second coordinate space.

13. The non-transitory computer-readable medium of claim 8, further comprising:

displaying an animated transition of the conversion from the first coordinate space to the second coordinate space.

14. The non-transitory computer-readable medium of claim 8, wherein the first coordinate space is a Cartesian coordinate space and wherein the second coordinate space is a polar coordinate space.

15. A system comprising:

a memory component; and a processing device coupled to the memory component, the processing device to perform operations comprising:

receiving a request to convert a chart including a plurality of data-bound graphic objects from cartesian space to polar space;

identifying the plurality of data-bound graphic objects associated with the chart to be converted to the polar space;

generating a view of the chart in polar space by converting the plurality of data-bound graphic objects to the polar space;

displaying a shadow view of the chart in cartesian space adjacent to the view of the chart in polar space, wherein the shadow view is an editable representation of the chart in cartesian space; and automatically updating the view of the chart in polar space in real time by converting a change made to the chart in cartesian space to the polar space.

16. The system of claim 15, wherein automatically updating the view of the chart in polar space by converting the change made to the chart in cartesian space to the polar space further comprises:

receiving the change to at least one data-bound graphic object of the shadow view of the chart in cartesian space;

converting the change from the cartesian space to the polar space; and updating the view of the plurality of data-bound graphic objects of the chart in polar space based on the converted change.

17. The system of claim 15, wherein the plurality of data-bound graphic objects include a first subset of data-bound graphic objects that are converted to polar space and a second subset of data-bound graphic objects that are repositioned in polar space.

* * * * *